United States Patent
Ikeda

(10) Patent No.: US 10,628,095 B2
(45) Date of Patent: Apr. 21, 2020

(54) TERMINAL APPARATUS, COMMUNICATION SYSTEM, COMPUTER-READABLE RECORDING MEDIUM, AND COMMUNICATION CONTROL METHOD

(71) Applicant: SEIKO EPSON CORPORATION, Tokyo (JP)

(72) Inventor: Iwane Ikeda, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 16/287,468

(22) Filed: Feb. 27, 2019

(65) Prior Publication Data

US 2019/0265924 A1    Aug. 29, 2019

(30) Foreign Application Priority Data

Feb. 27, 2018    (JP) ................................ 2018-032907

(51) Int. Cl.
| | | |
|---|---|---|
| *H04N 1/00* | (2006.01) | |
| *G06F 3/12* | (2006.01) | |
| *H04M 1/725* | (2006.01) | |
| *H04W 84/12* | (2009.01) | |
| *H04W 88/06* | (2009.01) | |
| *H04W 4/80* | (2018.01) | |

(52) U.S. Cl.
CPC .......... *G06F 3/1236* (2013.01); *G06F 3/1209* (2013.01); *G06F 3/1221* (2013.01); *G06F 3/1292* (2013.01); *H04M 1/7253* (2013.01); *H04W 4/80* (2018.02); *H04W 84/12* (2013.01); *H04W 88/06* (2013.01)

(58) Field of Classification Search
CPC .... G06F 3/1236; G06F 3/1292; G06F 3/1221; G06F 3/1209; H04M 1/7253; H04W 4/80; H04W 88/06; H04W 84/12
USPC ........................................................ 358/1.13
See application file for complete search history.

(56) References Cited

U.S. PATENT DOCUMENTS

2016/0286343 A1    9/2016  Terashita et al.
2018/0341442 A1*  11/2018  Nagasawa ............. G06F 3/1222

FOREIGN PATENT DOCUMENTS

JP        2016-187089 A    10/2016

* cited by examiner

*Primary Examiner* — Saeid Ebrahimi Dehkordy
(74) *Attorney, Agent, or Firm* — Workman Nydegger

(57) ABSTRACT

Provided is a terminal apparatus including a first wireless communication interface that performs wireless communication with an electronic apparatus using a first wireless communication scheme, a second wireless communication interface that performs wireless communication with the electronic apparatus using a second wireless communication scheme, and a processor. The processor instructs the electronic apparatus, a communication connection to which is made with the first wireless communication scheme, to perform a job, and then performs control that turns off the wireless communication in compliance with the first wireless communication scheme and acquires status information on the electronic apparatus using the second wireless communication scheme.

13 Claims, 19 Drawing Sheets

FIG. 7

| NAME | IDENTIFICATION INFORMATION | CAPABILITY |
|---|---|---|
| PRINTER 1 | MAC ADDRESS 1 | Capability1 |
| PRINTER 2 | MAC ADDRESS 2 | Capability2 |
| PRINTER 4 | MAC ADDRESS 4 | Capability4 |
| PRINTER 5 | MAC ADDRESS 5 | Capability5 |

FIG. 12

| BEACON IDENTIFIER | IDENTIFICATION INFORMATION ON ELECTRONIC APPARATUS (MAC ADDRESS) | STATUS INFORMATION ON ELECTRONIC APPARATUS |
|---|---|---|

FIG. 17

| BEACON IDENTIFIER | IDENTIFICATION INFORMATION ON ELECTRONIC APPARATUS (MAC ADDRESS) | STATUS INFORMATION ON ELECTRONIC APPARATUS | SSID | PASSWORD |
|---|---|---|---|---|

TERMINAL APPARATUS, COMMUNICATION SYSTEM, COMPUTER-READABLE RECORDING MEDIUM, AND COMMUNICATION CONTROL METHOD

BACKGROUND

1. Technical Field

The present invention relates to a terminal apparatus, a communication system, a computer-readable recording medium, and a communication control method.

2. Related Art

In the related art, terminal apparatuses each of which performs communication with an electronic apparatus using a wireless communication scheme such as a wireless LAN are known. The wireless LAN, for example, is for communication that complies with Wi-Fi (a registered trademark) standards. As this terminal apparatus, a smartphone or the like is considered that transmits print data to an electronic apparatus that is a printer, through wireless communication which complies with Wi-Fi standards.

Furthermore, a technique is also known that uses wireless communication in compliance with a different wireless communication scheme when a connection in compliance with a given wireless communication scheme is established. In JP-A-2016-187089, a technique is disclosed in which a connection between a portable terminal and a printer switches to Wi-Fi based on information that is acquired with Bluetooth Low Energy (BLE) (Bluetooth is a registered trademark).

In terminal apparatus in the related art, in some cases, for a reduction in power consumption or the like, Wi-Fi is usually set to be OFF, and, only when necessary, Wi-Fi is set to be ON. For example, when print data is transmitted to a printer, Wi-Fi that enables high-speed communication compared with BLE is set to be ON, and in other states, Wi-Fi is set to be OFF.

In JP-A-2016-187089, a technique is disclosed in which information necessary for an advertisement packet in compliance with BLE is acquired before making a Wi-Fi connection to a printer, in which print data is transmitted after making the Wi-Fi connection, and in which the Wi-Fi connection is released if the transmission of the print data is completed. However, in a case where a status of the printer is not monitored after the print data is transmitted, because the terminal apparatus cannot recognize that printing is not normally completed, there is a problem in terms of convenience. Furthermore, in a case where the Wi-Fi connection is made in order to monitor a status of an electronic apparatus, an effect of reducing power consumption decreases.

SUMMARY

An advantage of some aspects of the invention is to provide a terminal apparatus, a communication system, a computer-readable recording medium, and a communication control method, and the like, which are capable of reducing power consumption and so on while suppressing a decrease in convenience.

According to an aspect of the invention, there is provided a terminal apparatus including: a first wireless communication unit that performs wireless communication with an electronic apparatus using a first wireless communication scheme; a second wireless communication unit that performs wireless communication with the electronic apparatus using a second wireless communication scheme that is different from the first wireless communication scheme; and a processing unit that performs communication control of the first wireless communication unit and the second wireless communication unit, in which the processing unit instructs the electronic apparatus, a communication connection to which is made with the first wireless communication scheme, to perform a job, and then performs control that turns off the wireless communication in compliance with the first wireless communication scheme and acquires status information on the electronic apparatus using the second wireless communication scheme.

Furthermore, in the terminal apparatus, the processing unit may acquire information as to whether or not the electronic apparatus completely performs the job, as the status information on the electronic apparatus, using the second wireless communication scheme.

Furthermore, in the terminal apparatus, the processing unit may perform processing that changes a display mode of a screen on which the status information is displayed, before the job is completely performed in the electronic apparatus and after the job is completed.

Furthermore, in the terminal apparatus, when instructing the electronic apparatus to perform the job, the processing unit may perform control that switches the wireless communication in compliance with the first wireless communication scheme from OFF to ON.

Furthermore, in the terminal apparatus, before instructing the electronic apparatus to perform the job, the processing unit may acquire the status information on the electronic apparatus using the second wireless communication scheme.

Furthermore, in the terminal apparatus, the processing unit may acquire the status information on the electronic apparatus, which is available before the instruction for performing the job is provided, using a beacon signal in compliance with the second wireless communication scheme, and may acquire the status information on the electronic apparatus, which is available after the instruction for performing the job is provided, through communication that is available after a communication connection in compliance with the second wireless communication scheme is established.

Furthermore, in the terminal apparatus, the second wireless communication unit may acquire connection information that is used for the first wireless communication scheme, using the beacon signal that is transmitted from the electronic apparatus, before the instruction for performing the job is provided, and the first wireless communication unit may establish a connection to the electronic apparatus using the connection information.

Furthermore, in the terminal apparatus, the processing unit may perform processing that switches an operation mode of the terminal apparatus between a first mode and a second mode, in the first mode, after the instruction for performing the job is provided, the processing unit may perform control that turns off the wireless communication in compliance with the first wireless communication scheme and may acquire the status information on the electronic apparatus using the second wireless communication scheme, and, in the second mode, after the instruction for performing the job is provided, the processing unit may maintain a state where the wireless communication in compliance with the first wireless communication scheme is turned on and may acquire the status information on the electronic apparatus using the first wireless communication scheme.

Furthermore, in the terminal apparatus, in the first mode, the processing unit may perform processing that displays a display screen which includes an object alerting that a low power consumption mode is entered, on a display unit.

Furthermore, in the terminal apparatus, the first wireless communication scheme may be a communication scheme that complies with Wi-Fi standards, and the second wireless communication scheme may be a communication scheme that complies with Bluetooth standards.

Furthermore, according to another aspect of the invention, there is provided a communication system including any one of the terminal apparatus described above, and the electronic apparatus.

Furthermore, according to still another aspect of the invention, there is provided a computer-readable recording medium on which a program is stored, the program causing a computer to function as: a first wireless communication unit that performs wireless communication with an electronic apparatus using a first wireless communication scheme; a second wireless communication unit that performs wireless communication with the electronic apparatus using a second wireless communication scheme that is different from the first wireless communication scheme; and a processing unit that performs communication control of the first wireless communication unit and the second wireless communication unit, in which the processing unit instructs the electronic apparatus, a communication connection to which is made with the first wireless communication scheme, to perform a job, and then performs control that turns off the wireless communication in compliance with the first wireless communication scheme and acquires status information on the electronic apparatus using the second wireless communication scheme.

Furthermore, according to still another of the invention, there is provided a communication control method in a terminal apparatus including a first wireless communication unit which performs wireless communication with an electronic apparatus using a first wireless communication scheme, and a second wireless communication unit which performs wireless communication with the electronic apparatus using a second wireless communication scheme that is different from the first wireless communication scheme, the method including: instructing the electronic apparatus, a communication connection to which is made with the first wireless communication scheme, to perform a job; performing control that turns off the wireless communication in compliance with the first wireless communication scheme; and acquiring status information on the electronic apparatus using the second wireless communication scheme.

BRIEF DESCRIPTION OF THE DRAWINGS

The invention will be described with reference to the accompanying drawings, wherein like numbers reference like elements.

FIG. 7 is a diagram illustrating an example of a structure of data relating to the electronic apparatus, which is stored in a storage unit of the terminal apparatus.

FIG. 12 is a diagram illustrating an example of a data structure of a BLE beacon signal.

FIG. 17 is a diagram illustrating another example of the data structure of the BLE beacon signal.

DESCRIPTION OF EXEMPLARY EMBODIMENTS

The present embodiment will be described below. It is noted that the present embodiment which will be described below does not improperly limit the subject matter of the invention that is claimed in a claim. Furthermore, all configurations that will be described in the present embodiment are not necessarily configurational requirements for the invention.

1. Example of a Configuration of a System

Figure 1:
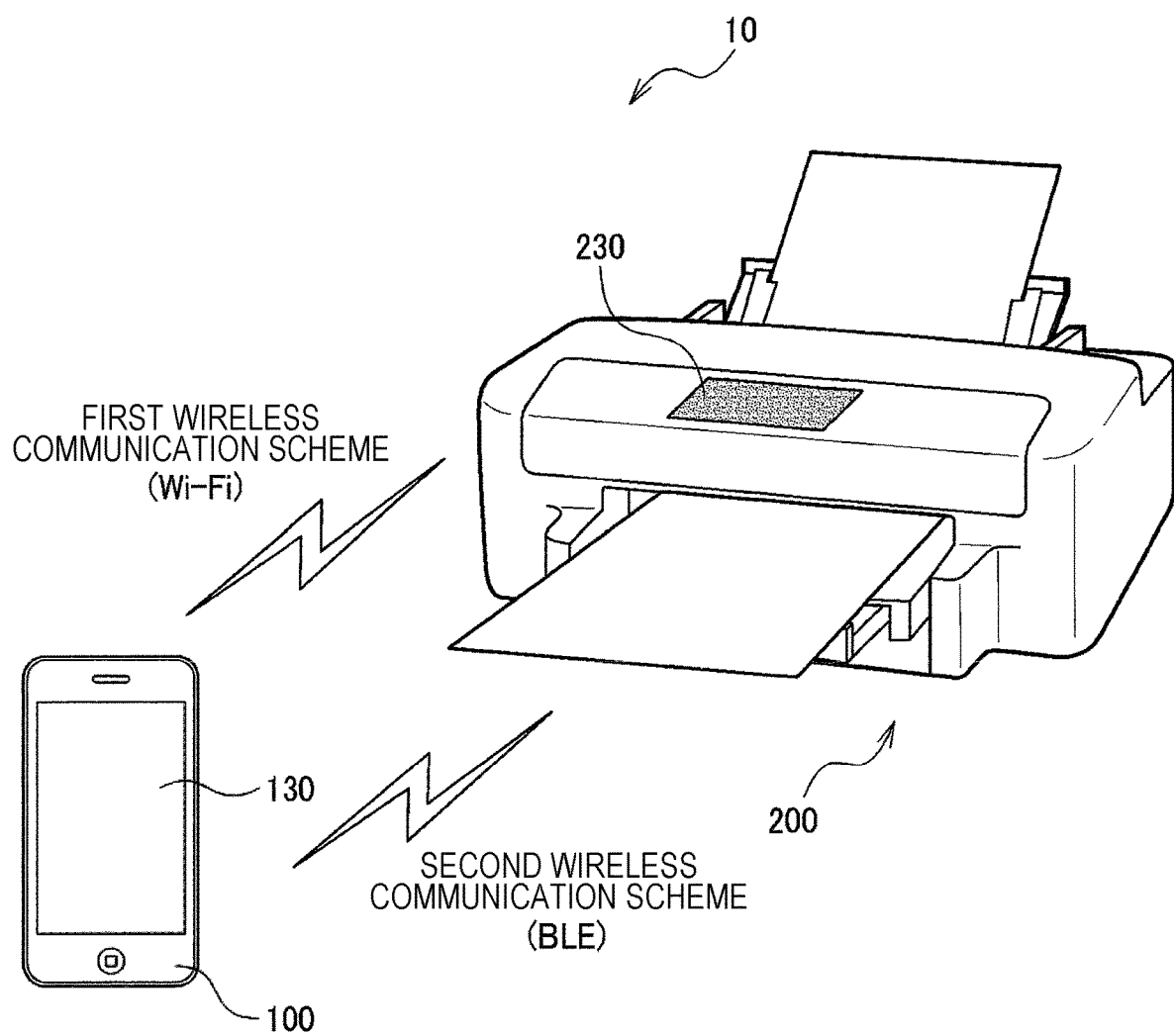
FIG. 1 is a diagram illustrating an example of a configuration of a communication system.

FIG. 1 is a diagram schematically illustrating an example of a communication system 10 that includes a terminal apparatus 100 according to the invention. The communication system 10 includes the terminal apparatus 100 and an electronic apparatus 200.

The terminal apparatus 100 is a portable terminal apparatus, such as a smartphone or a tablet terminal. However, the terminal apparatus 100 may be any other apparatus such as a personal computer (PC).

The electronic apparatus 200, for example, is a printer. Alternatively, the electronic apparatus 200 may be a scanner, a facsimile machine, or a copy machine. The electronic apparatus 200 may be a multifunction peripheral (MFP) that has multiple functions, and a multifunction peripheral that has a printing function is also an example of the printer. The electronic apparatus 200 according to the present embodiment possibly makes a connection to the terminal apparatus 100 using a first wireless communication scheme, and examples of the electronic apparatus 200 include further any arbitrary apparatus that possibly transmits a beacon signal in compliance with a second wireless communication scheme. The electronic apparatus 200 may be a projector, a head-mounted display device, a wearable device, a biological information measuring instrument, such as a pulse meter or a physical activity meter, a robot, a video apparatus, such as a camera, a portable information terminal, such as a smartphone, a physical quantity measuring instrument, or the like.

As illustrated in FIG. 1, the terminal apparatus 100 and the electronic apparatus 200 possibly perform wireless communication in compliance with the first wireless communication scheme and wireless communication in compliance with the second wireless communication scheme.

From the perspective of standards, a communication speed is higher in the first wireless communication scheme than in the second wireless communication scheme. The first wireless communication scheme is a wireless LAN in a narrow sense, and, more specifically, Wi-Fi. An example will be described below in which the first wireless communication scheme is Wi-Fi, but it is possible that the first wireless communication scheme may be any other communication scheme.

Although not illustrated in FIG. 1, there are two configurations in which the terminal apparatus 100 makes a connection to the electronic apparatus 200 using the first wireless communication scheme. The terminal apparatus 100 may make a connection to the electronic apparatus 200 through any other apparatus such as a wireless LAN router, and makes a direct connection to the electronic apparatus 200. For example, in a case where the electronic apparatus 200 operates in an infrastructure mode and connects to a given external access point, the terminal apparatus 100 makes a wireless connection to the external access point, and thus communication is performed between the terminal apparatus 100 and the electronic apparatus 200. In this case, the connection between the electronic apparatus 200 and the external access point is not limited to the wireless connection and may be realized in a wired manner.

Alternatively, the electronic apparatus 200 activates an internal access point and the terminal apparatus 100 makes a connection to the internal access point, and thus communication is directly performed between the terminal apparatus 100 and the electronic apparatus 200. The direct connection between the terminal apparatus 100 and the electronic apparatus 200 may be made through communication in compliance with Wi-Fi Direct (WFD) standards, and may be performed in a Wi-Fi ad hoc mode.

It is noted that it is assumed that the electronic apparatus 200 according to the present embodiment is an apparatus that either makes a connection to the external access point or activates the internal access point. In other words, it is not assumed that one electronic apparatus 200 makes a connection to the external access point and activates the internal access point at the same time.

From the perspective of standards, a communication speed is high and transmission of the beacon signal is possible in the first wireless communication scheme, compared with the second wireless communication scheme. Furthermore, the second wireless communication scheme is a communication scheme in which power consumption is lower than in the first wireless communication scheme. The second wireless communication scheme is Bluetooth in a narrow sense, and more precisely, BLE. An example will be described below in which the second wireless communication scheme refers to BLE, but it is possible that the first wireless communication scheme may be any other communication scheme. The beacon signal in compliance with BLE corresponds to an advertisement packet. It is noted that the transmission of the beacon signal is possible with the first wireless communication scheme without any constraint. If the first wireless communication scheme is Wi-Fi, the electronic apparatus 200 transmits a beacon signal that makes service set identifier (SSID) of its own known. A beacon signal that complies with Wi-Fi standards and a beacon signal that complies with BLE standards are hereinafter expressed as a Wi-Fi beacon signal a BLE beacon signal, respectively.

Figure 2:
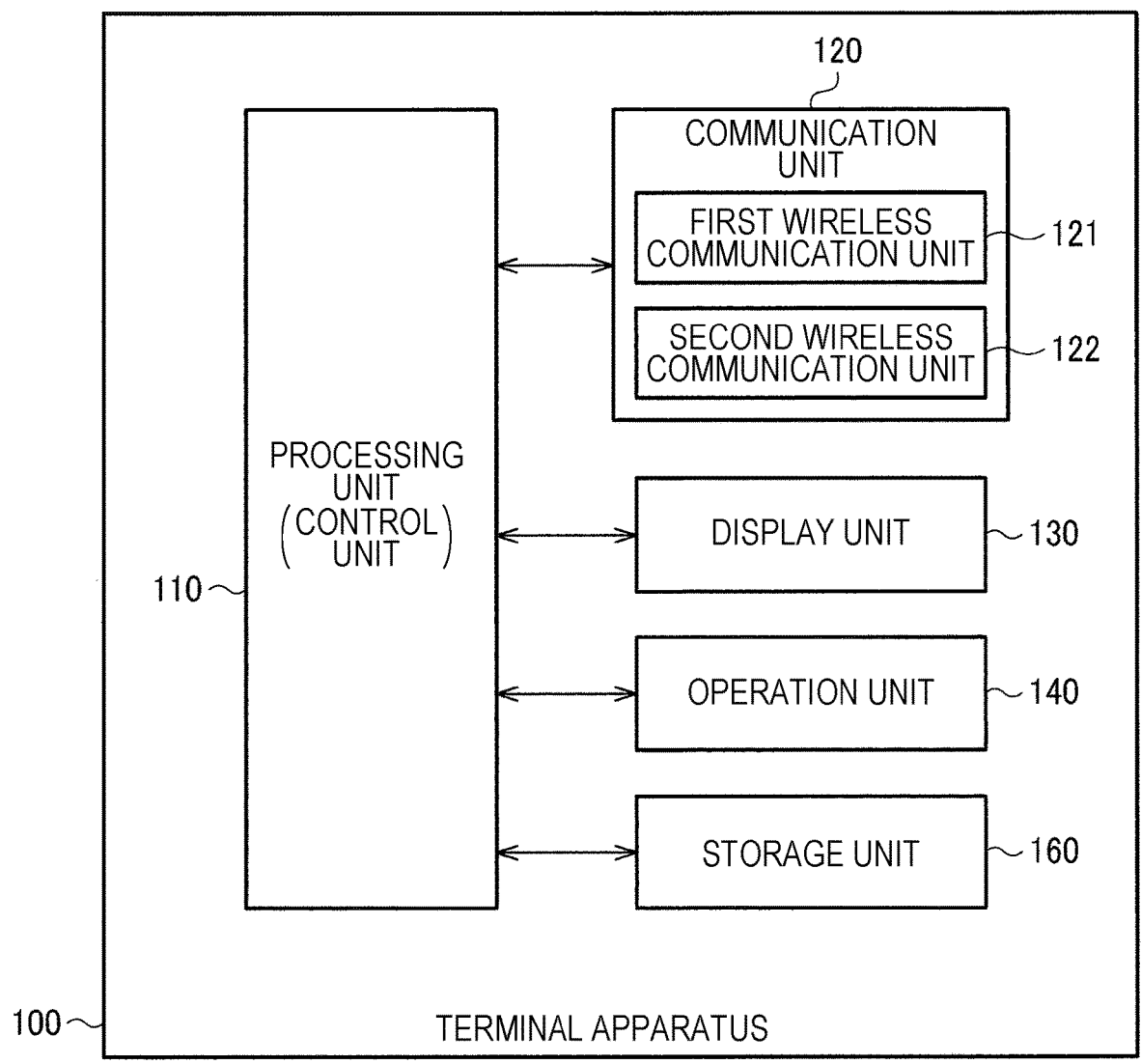
FIG. 2 is a diagram illustrating an example of a configuration of a terminal apparatus.

FIG. 2 is a block diagram illustrating an example of a configuration of the terminal apparatus 100. The terminal apparatus 100 includes a processing unit 110, a communication unit 120, a display unit 130, an operation unit 140, and a storage unit 160. For example, the processing unit 110 is a processor or a controller, the communication unit 120 is a communication interface, the display unit 130 is a display, the operation unit 140 is an operation button or the like, and the storage unit 160 is a storage device or a memory.

The processing unit 110 performs control of each of the communication unit 120, the display unit 130, the operation unit 140, and the storage unit 160.

Each processing operation and each function according to the present embodiment, which is performed by the processing unit 110, can be realized by a processor that includes hardware. For example, each processing operation according to the present embodiment can be realized by a processor that operates based on information such as a program, and a memory in which the program and the information are stored. The processor here, for example, may cause a function of each unit to be realized in individual hardware or may cause the function of each unit to be realized in integrated hardware. For example, the processor can include a piece of hardware, and the piece of hardware can include at least one of a circuit that processes a digital signal and a circuit that processes an analog signal. For example, the processor can be configured with one or multiple circuit devices that are mounted on a circuit substrate, or with one or multiple circuit elements. The circuit device here is an integrated circuit (IC), or the like, and the circuit element is a resistor, a capacitor, or the like. The processor, for example, may be a central processing unit (CPU). However, the processor is not limited to the CPU, and it is possible that various processors such as a graphics processing unit (GPU) and a digital signal processor (DSP) are used. Furthermore, the processor may be a hardware circuit such as an application specific integrated circuit (ASIC). Furthermore, the processor may be configured with multiple CPUs, and may be configured with hardware circuits such as multiple ASICs. Furthermore, the processor may be configured with a combination of multiple CPUs and hardware circuits such as multiple ASICs.

The communication unit 120 includes a first wireless communication unit 121 and a second wireless communication unit 122. The first wireless communication unit 121 is a wireless communication device that performs wireless communication that complies with Wi-Fi standards, and the second wireless communication unit 122 is a wireless communication device that performs wireless communication in compliance with BLE standards. Each wireless communication device, for example, is a wireless communication chip.

The display unit 130 is configured with a display on which various pieces of information are displayed for the user, and the like, and the operation unit 140 is configured with a button on which a user performs an input operation, and the like. It is noted that the display unit 130 and the operation unit 140 may be configured to be integrally combined into a touch panel.

The storage unit 160 (a storage device or a memory) stores various information including a data and a program. The processing unit 110 or the communication unit 120, for example, operates with the storage unit 160 as a working area. The storage unit 160 may be a semiconductor memory, such as a static random access memory (SRAM) or a dynamic random access memory (DRAM), may be a register, be a magnetic memory device such as a hard disk drive (HDD), and may be an optical storage device such as an optical disk.

Figure 3:
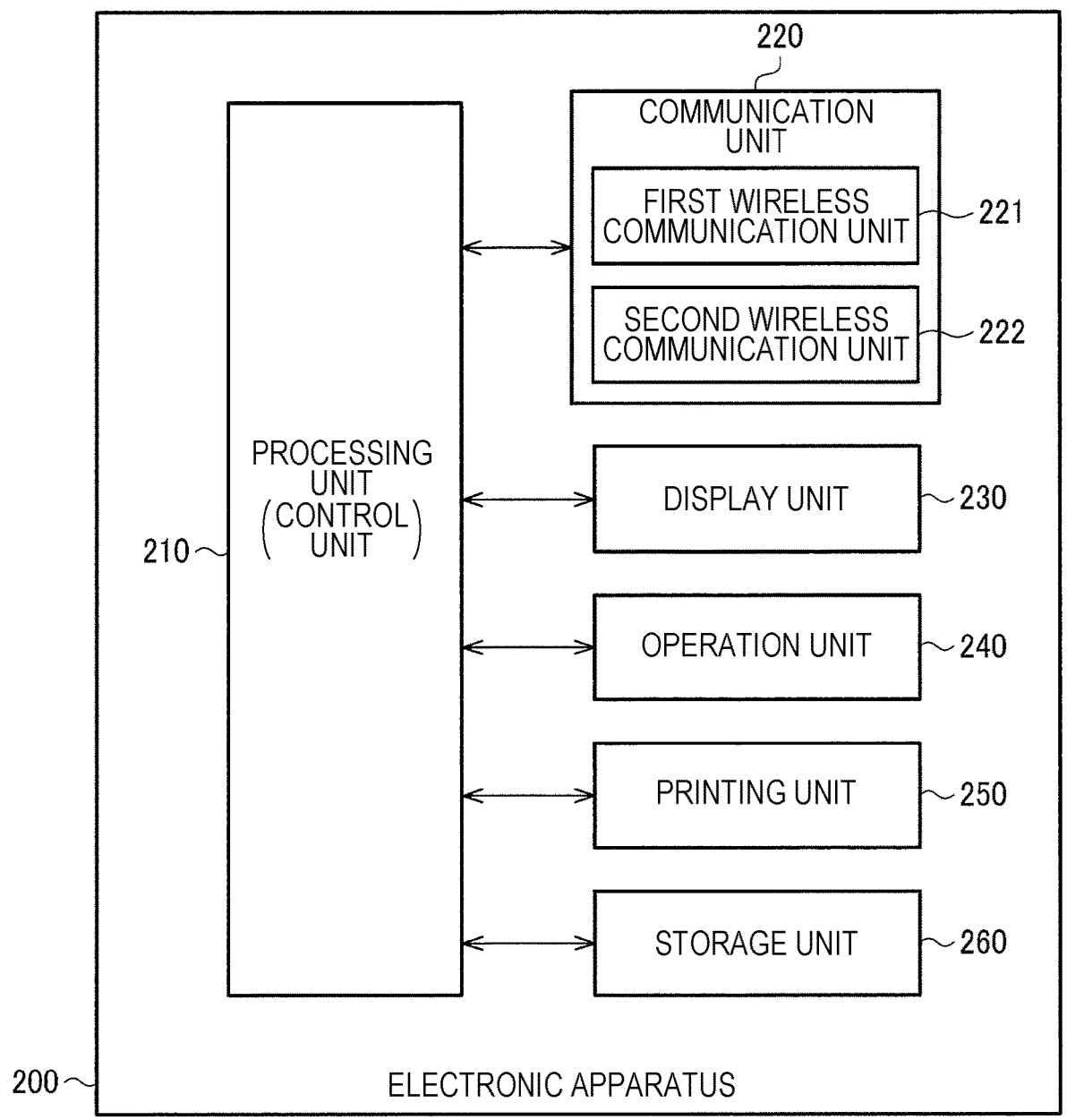
FIG. 3 is a diagram illustrating an example of an electronic apparatus.

FIG. 3 is a block diagram illustrating an example of a configuration of the electronic apparatus 200. It is noted that FIG. 3 illustrates the electronic apparatus 200 that has a printing function and that an example where the electronic apparatus 200 is a printer will also be described below. However, as described above, examples of the electronic apparatus 200 further include apparatuses other than the printer. The electronic apparatus 200 includes a processing unit 210, a communication unit 220, a display unit 230, an operation unit 240, a printing unit 250, and a storage unit 260.

The processing unit 210 performs control of each of the units of the electronic apparatus 200. For example, the processing unit 210 can include multiple CPUs, such as a main CPU and a sub-CPU, or a micro-processing unit (MPU). The main CPU performs control of each of the units of the electronic apparatus 200 or overall control of the electronic apparatus 200. The sub-CPU performs various processing operations for printing, for example, in a case where the electronic apparatus 200 is a printer. Alternatively, a CPU for communication processing may be further provided.

The communication unit 220 includes a first wireless communication unit 221 and a second wireless communication unit 222. The first wireless communication unit 221 is a wireless communication device that performs wireless communication that complies with Wi-Fi standards, and the second wireless communication unit 222 is a wireless communication device that performs wireless communication in compliance with BLE standards. The first wireless communication unit 221 makes a Wi-Fi connection to an external access point. Alternatively, the first wireless communication unit 221 activates an internal access point according to a given connection setting, and receives a connection request from the terminal apparatus 100. The connection settings are settings of an SSID, a password or a passphrase, a communication frequency band, an encryption scheme, and the like. The setting of the communication frequency band corresponds to a channel setting.

Furthermore, although not illustrated in FIG. 3, the communication unit 220 may include a third communication unit for making a connection to an external access point in a wired-connection manner. The communication unit 220, for example, is configured in such a manner that the first wireless communication unit 221 and the third communication unit are included and that effective or ineffective switching among first to third connection modes is possible. The first connection mode is a connection mode in which the first wireless communication unit 221 makes a wireless connection to the external access point. The second connection mode is a connection mode in which the first wireless communication unit 221 activates the internal access point. The third connection mode is a connection mode in which the third communication unit makes a wired connection to the external access point. Furthermore, a modification implementation in which one of the first wireless communication unit 221 and the third communication unit is omitted is also possible.

The display unit 230 is configured with a display on which various pieces of information are displayed for the user, and the like, and the operation unit 240 is configured with a button on which the user performs an input operation, and the like. It is noted that, for example, the display unit 230 and the operation unit 240 may be configured to be integrally combined into a touch panel.

The printing unit 250 includes a printing engine. The printing engine has a mechanical configuration in which printing of an image is performed on a printing medium. The printing engine, for example, includes a transportation mechanism, an ink jet type discharge head, and a driving mechanism for a carriage including the discharge head, and the like. The printing engine discharges ink from the discharge head onto the printing medium that is transmitted by the transportation mechanism, and thus prints an image on the printing medium. As the printing medium, various media can be used such as a paper sheet and a piece of cloth. It is noted that the specific configuration of the printing engine is not limited to that described here as an example, and may be one in which printing that uses toner is performed using an electrophotographic method.

The storage unit 260 (a storage device or a memory) stores various information including a data and a program. The processing unit 210 or the communication unit 220, for example, operates with the storage unit 260 as a working area. The storage unit 260 may be a semiconductor memory, may be a register, may be a magnetic memory device, and may be an optical storage device.

2. Technique According to the Present Embodiment

Next, a technique according to the present embodiment will be described. First, an outline is described, and thereafter, processing is in detail described.

2.1 Outline

Figure 4:
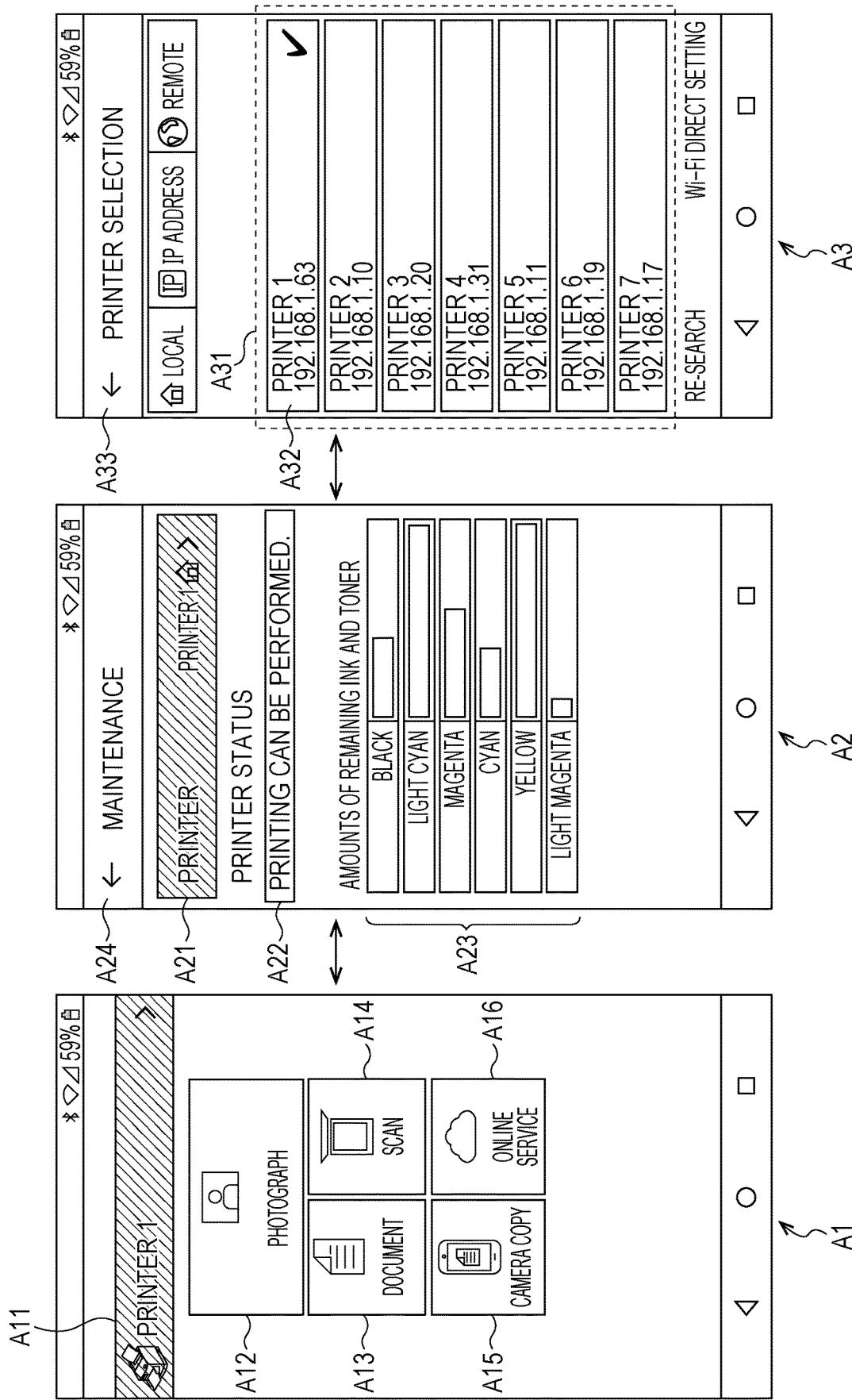
FIG. 4 is a diagram illustrating an example of transition of a screen that is displayed on a display unit.

FIG. 4 illustrates an example of an operation screen of a print application of the terminal apparatus 100. The print application runs on an Operating System (OS) of the terminal apparatus 100, and performs various processing operations relating to printing.

A1 of FIG. 4 is a home screen of the print application, and for example, is a screen that is displayed when the print application is activated. On the home screen, a display (A11) of a name of a designation electronic apparatus and a display of one or multiple card type display objects that correspond to functions that are possibly performed by the designation electronic apparatus are displayed. The card type display object is hereinafter expressed simply as a card. The designation electronic apparatus is the electronic apparatus 200 that is designated as a target that is instructed by the terminal apparatus 100 to perform a job. In an example in FIG. 4, a photograph card (A12), a document card (A13), a scan card (A14), a camera copy card (A15), and an online service card (A16) are displayed as cards, an operation is performed on each card, and thus the print application performs a corresponding function.

For example, in a case where the photography card is selected, the print application displays pieces of photograph data that are stored in the terminal apparatus 100, and urges the user to select photograph data that is a printing target. When an operation of selecting the photograph data is performed, proceeding to a screen for an instruction for performing printing, which will be described below with reference to FIG. 5, takes place. In a case where the document card is selected, the print application displays a screen for urging the user to select document data that is a printing target, and, when an operation of selecting the document data is performed, proceeding to the screen for an instruction for performing printing takes place.

In the example in FIG. 4, because a printer 1 that is a designation electronic apparatus has a function of a scanner, the scan card is displayed on the home screen. In a case where the scan card is selected, the print application instructs the printer 1 to perform an operation of scanning a medium, and performs processing that receives scan data.

The camera copy is a function of performing keystone correction on a capture image that is captured in a camera and of creating print data. In a case where the camera copy card is selected, the print application activates the camera. When the camera captures an image, image processing such as the keystone correction is performed, print data is created, and proceeding to the screen for an instruction for performing printing takes place. The online service is a service for print data that is retained in an online storage. In a case where the online service card is selected, the print application makes a connection to the Internet using a mobile communication network, Wi-Fi, or the like, and displays the data in the online storage. When an operation of selecting data that is a printing target is performed, proceeding to the screen for an instruction for performing printing takes place.

A2 of FIG. 4 is a maintenance screen for the designation electronic apparatus. On the home screen, in a case where an operation is performed on an A11 area, proceeding to the maintenance screen takes place. On the maintenance screen, a name (A21) of the designation electronic apparatus, a status (A22) of the designation electronic apparatus, and information (A23) on an amount of remaining ink or toner are displayed. As illustrated in A22 or A23, status information on the electronic apparatus 200 is displayed on the maintenance screen. The status information will be described in detail below. On the maintenance screen, when an operation is performed on a return button (A24), proceeding to the home screen takes place. Furthermore, although not illustrated in FIG. 4, the maintenance screen may include an operation object for causing the designation electronic apparatus to perform a maintenance operation such as head cleaning.

A3 of FIG. 4 is a screen for selection of the designation electronic apparatus. On the maintenance screen, in a case where an operation is performed on an A21 area, proceeding to the screen for selection of the designation electronic apparatus takes place. In a state where the designation electronic apparatus is not selected, in a case where an operation is performed on the A11 area, direct proceeding to the screen for selection may take place without displaying the maintenance screen.

On the screen for selection, the electronic apparatus 200 that is a candidate for the designation electronic apparatus is list-displayed (A31). The electronic apparatus 200 that is displayed on the screen for selection is the electronic apparatus 200 that has been selected in the past by the terminal apparatus 100. Alternatively, the processing unit 110 may search for the electronic apparatus 200 by using a Wi-Fi function of the first wireless communication unit 121, and may list-display the electronic apparatus 200 that is found as a result of the search. Processing that searches for the electronic apparatus 200 can be realized by first search processing that transmits a response request packet over a network and receives a response packet or second search processing that receives the Wi-Fi beacon signal. In the first search processing, the name of, or the identification information on, the electronic apparatus 200 can be acquired, and in the second search processing, an SSID of, or the identification information on, of the electronic apparatus 200 can be acquired. In an example in FIG. 6, which will be described below, the first search processing searches a network, which is formed by an external access point 20, for electronic apparatuses 200-1 to 200-3 that operate in an infrastructure mode. Electronic apparatuses 200-4 to 200-5 that function as access points are searched for by the second search processing. In the example in FIG. 4, an object A32 in the shape of a check mark is displayed in a state of being associated with the printer 1 that has been selected as the designation electronic apparatus. On the screen for selection, when an operation is performed on a return button (A33), proceeding to the maintenance screen takes place.

Figure 5:
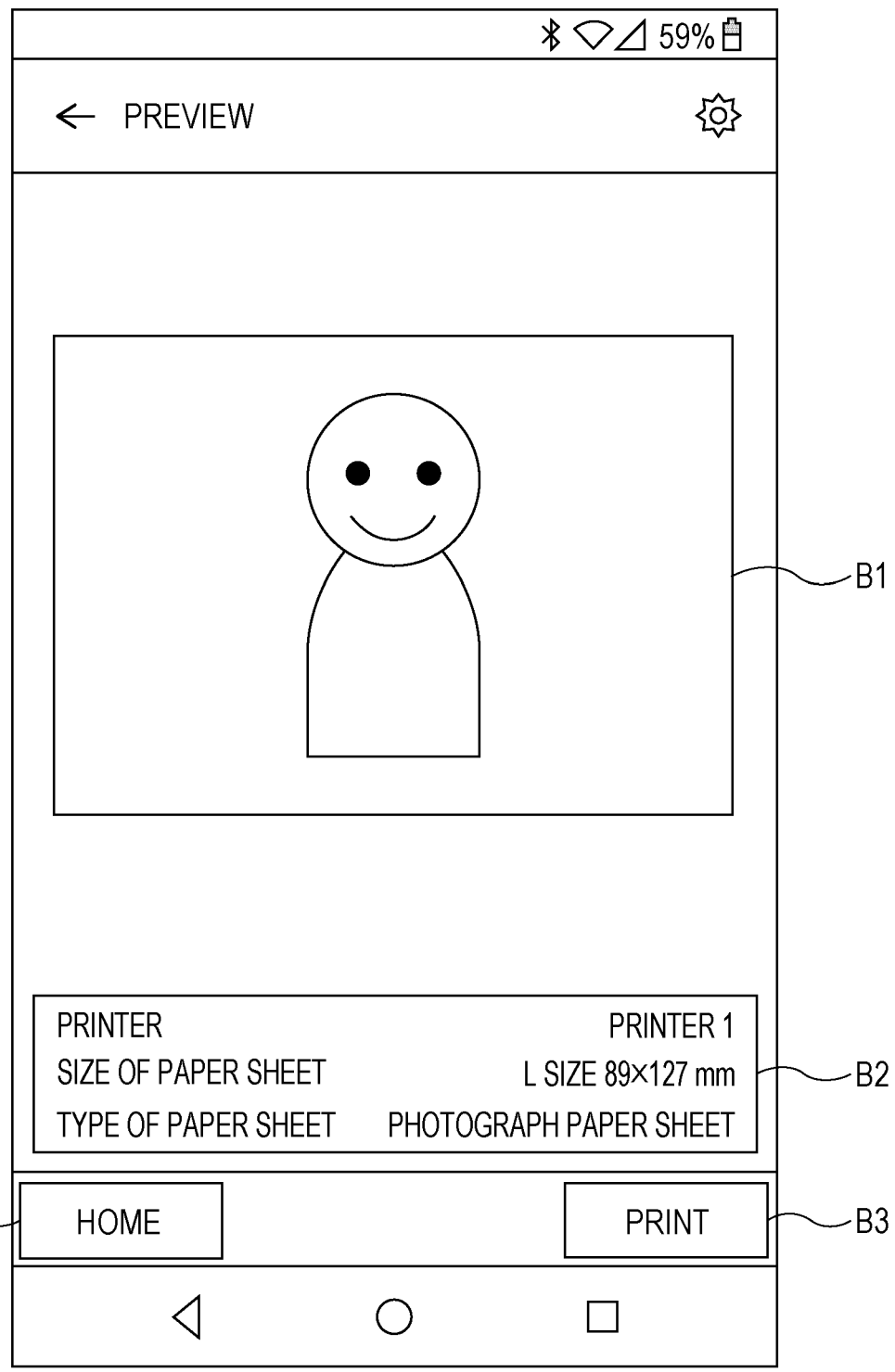
FIG. 5 is a diagram illustrating an example of a screen for an instruction for performing printing, which is a screen for an instruction for performing a job.

FIG. 5 illustrates an example of the screen for an instruction for performing printing. As described above, in a case where data that is a printing target is determined, the screen for an instruction for performing printing is displayed. In an example in FIG. 5, on the screen for an instruction for performing printing, a preview (B1) of print data, a print setting (B2), a print button (B3), and a button (B4) for transitioning to the home screen are displayed. The printing setting includes a name of a printer that is a designation electronic apparatus, a size of paper sheet that is used for printing, and information on a type of paper sheet.

In FIG. 5, when an operation is performed on a print button, the processing unit 110 that operates according to the print application transmits print data to the designation electronic apparatus, and instructs the designation electronic apparatus to perform a printing job.

Because the terminal apparatus 100 transmits a large amount of print data at a high speed, it is considered that a Wi-Fi connection to a printer is made. However, regarding the print application in the related art, in most cases, Wi-Fi is usually set to be OFF, and, only whenever necessary, Wi-Fi is set to be ON. Power is consumed much more in Wi-Fi than in a wireless communication scheme such as BLE. The terminal apparatus 100 is assumed to be a portable terminal apparatus such as a smartphone. Thus, in order for the terminal apparatus 100 to operate on a capacity-limited battery for a long time, there is a need to shorten the time for which Wi-Fi is set to be ON.

Furthermore, although Wi-Fi itself is set to be ON, in some cases, the establishment of the connection to the electronic apparatus 200 is limited to a necessary situation. This is because, in a case where a Wi-Fi connection to the Internet is made, if a connection destination switches to the electronic apparatus 200, a communication over the Internet cannot be performed. In an electronic apparatus 200-4 or an electronic apparatus 200-5, which will be described below with reference to FIG. 6, a direct connection is made, with WFD, between the terminal apparatus 100 and the electronic apparatus. For this reason, while a connection is being established, a connection between the terminal apparatus 100 and an external access point 20 is released, and the terminal apparatus 100 cannot make a Wi-Fi connection to the Internet. If the time for which the terminal apparatus 100 and the electronic apparatus 200 are connected to each other with WFD is shortened, the time for which the terminal apparatus 100 cannot make a connection to the terminal apparatus 100 can be shortened.

In either case, it is considered that the print application of the terminal apparatus 100 does not always establish a Wi-Fi connection to the designation electronic apparatus, and attempts to make a Wi-Fi connection to the designation electronic apparatus when a necessary situation occurs. The necessary situation is specifically a situation where an operation is performed on the print button (B3) in FIG. 5. At a stage of creating print data, there is no need to establish a Wi-Fi connection to the designation electronic apparatus. Furthermore, if transmission of the print data from the terminal apparatus 100 to the designation electronic apparatus is completed, at a subsequent stage of performing printing, it is not indispensable to establish the Wi-Fi connection to the designation electronic apparatus. By suppressing the Wi-Fi connection to the electronic apparatus 200, it is possible that power consumption is reduced or that the time for which the Wi-Fi connection to the Internet cannot be made is shortened.

However, for the purpose or the convenience of the print application, in addition to transmitting print data, a Wi-Fi connection to a printer is required. For example, after the print data is transmitted to the designation electronic apparatus, in the terminal apparatus 100, there is a demand to check whether a printing job is normally ended in the designation electronic apparatus. In such a case, the terminal apparatus 100 needs to receive the status information from the designation electronic apparatus. However, when the Wi-Fi connection to the electronic apparatus 200 is established in order to receive information, power consumption increases, or the time for which an Internet connection cannot be made increases.

The terminal apparatus 100 according to the present embodiment, as illustrated in FIG. 2 includes the first wireless communication unit 121 that performs wireless communication with the electronic apparatus 200 using the first wireless communication scheme, the second wireless communication unit 122 that performs wireless communication with the electronic apparatus 200 using the second wireless communication scheme that is different from the first wireless communication scheme, and the processing unit 110 that performs communication control of the first wireless communication unit 121 and the second wireless communication unit 122.

Then, the processing unit 110 instructs the electronic apparatus 200, a communication connection to which is made with the first wireless communication scheme, to perform a job, and then performs control that turns off the wireless communication in compliance with the first wireless communication scheme and acquires status information on the electronic apparatus 200 using the second wireless communication scheme.

The first wireless communication scheme is a communication scheme that complies with Wi-Fi standards, and the second wireless communication scheme is a communication scheme that complies with Bluetooth standards. Wi-Fi standards, for example, are IEEE 802.11 standards and are standards that are equivalent to IEEE 802.11 standards. Bluetooth standards, for example, are IEEE 802.15.1 standards, and are standards that are equivalent to IEEE 802.15.1 standards. Furthermore, standards include standards that reflect developments in the standards themselves. Furthermore, a change from each wireless communication scheme to a communication scheme that complies with any other standards is possible as described above.

Furthermore, the job here refers to an operation that the electronic apparatus 200 performs using a function of the electronic apparatus 200 itself. In a case where the electronic apparatus 200 is a printer, the job corresponds to the printing job. In a case where the electronic apparatus 200 is a scanner, the job corresponds to a scanning job. A main apparatus that performs a job is the electronic apparatus 200, but it is possible that any other apparatus provides an instruction for performing the job or that processing-target data in the job is transmitted and received to and from any other apparatus. The terminal apparatus 100 according to the present embodiment provides the instruction for performing the job and performs transmission and reception of the processing-target data, using the first wireless communication scheme.

Furthermore, the status information here is information indicating a status of the electronic apparatus 200, and includes information relating to the job that the electronic apparatus 200 is instructed by the terminal apparatus 100 to do. Specifically, the status information includes information indicating in which one of an in-progress status, a normally-ended status, and an error-caused abnormally-ended status the job that the electronic apparatus 200 is instructed to do is.

With the technique according to the present embodiment, after the electronic apparatus 200 is instructed to perform the job through a Wi-Fi connection, and then releases the Wi-Fi connection and acquires the status information on the electronic apparatus 200 that is instructed to perform the job using BLE. For the transmission of the instruction for performing a job and the processing-target data necessary for performing the job, Wi-Fi with which high-speed communication is possible is used, and thus efficient communication is possible. Moreover, in the present embodiment, a situation where the job that the electronic apparatus is instructed to perform is performed can be monitored using BLE. Accordingly, because the situation where the job is performed can be monitored from the terminal apparatus 100, it is possible that the user convenience is improved. By using BLE for monitoring, it is possible that, when compared with a case where Wi-Fi is used, power consumption is reduced or the time for which the Internet connection cannot be made is decreased.

2.2 Detailed Processing

Processing according to the present embodiment will be described in detail below. It is noted that, as will be described below, it is also possible that the status information is acquired using BLE before the instruction for performing the job is provided or the like, without being limited to being acquired using BLE after the instruction for performing the job is provided.

2.2.1 Example of a Specific Situation

Figure 6:
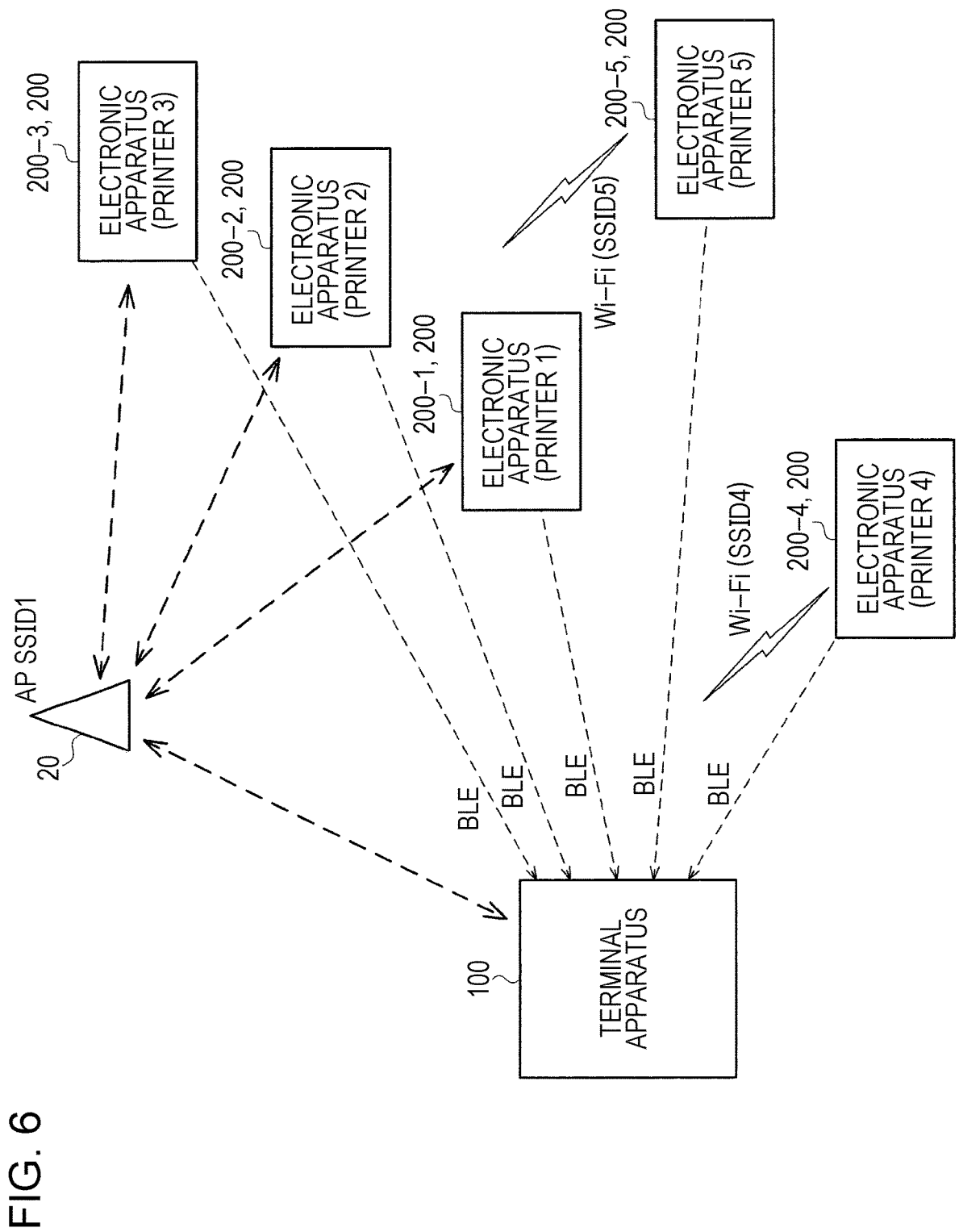
FIG. 6 is a diagram illustrating an example of a specific configuration of the communication system.

FIG. 6 illustrates a specific example of the system that includes the terminal apparatus 100 and the electronic apparatus 200. A plurality of electronic apparatuses 200 are present in the vicinity of the terminal apparatus 100. In FIG. 6, as the plurality of electronic apparatuses 200, five electronic apparatuses, that is, electronic apparatuses 200-1 to 200-5 are illustrated. The electronic apparatuses 200-1 to 200-5 are hereinafter expressed as a printer 1 to a printer 5, respectively, for convenience of description.

The printer 1 to the printer 3 are connected to the external access point 20 in a Wi-Fi infrastructure mode. The external access point 20 and the printers 1 to 3 may be connected to each other through a router over a wired LAN. In a case where the terminal apparatus 100 makes a Wi-Fi connection to the external access point 20, it is possible that the printer 1 to the printer 3 are connected to the terminal apparatus 100 through the external access point 20.

The printer 4 and the printer 5 each function as access points. Specifically, the first wireless communication unit

221 of each of the printer 4 and the printer 5 is activated and is possibly connected to the terminal apparatus 100 with WFD.

Furthermore, the printer 1 to the printer 5 transmit an advertisement packet that is a beacon signal that complies with the second wireless communication scheme, that is, a BLE beacon signal.

FIG. 7 illustrates an example of data relating to the electronic apparatus 200 that is a target to which the terminal apparatus 100 makes a Wi-Fi connection, which is data that is stored in the storage unit 160 of the terminal apparatus 100. As illustrated in FIG. 7, a printer name, identification information, and capability information are stored in the storage unit 160.

Pieces of identification information are pieces of information by which the electronic apparatuses 200 possibly identify each other. The identification information, for example, is a MAC address of the electronic apparatus 200, and, as the identification information, any other information that is a serial number, or the like may be used. Furthermore, the name is a manufacture number or the like of the electronic apparatus 200, and a plurality of electronic apparatus 200 are allowed to have the same name.

The capability is information that indicates a function of the electronic apparatus 200. If the electronic apparatus 200 is a printer, the capability includes information on a paper sheet size that the printer supports and printing mode information. The information on the paper sheet size is information that specifies a size of a printing paper sheet which the printer possibly uses for printing, and for example, is the information that printing in a postcard size and A5 and A4 size is possible, but that printing in a size greater than an A3 size can be performed. The printing mode information is information that indicates whether or not to support color printing, to support duplex printing, to support CD label printing, and so forth. Furthermore, it is possible that, in addition to those described above, the capability includes various pieces of information that specify functions that the printer possibly performs when performing printing. Furthermore, if the electronic apparatus 200 is a scanner, the capability is information that includes a size of a paper sheet that is possibly scanned, a resolution, a saving format of data that results from the scanning, and the like. It is noted that the terminal apparatus 100 is assumed to acquire the capability information from the electronic apparatus 200 through a Wi-Fi connection, but may acquire the capability information using BLE. On this occasion, the capability is transmitted and received with the BLE beacon signal without any constraint, but if an amount of data is considered, it is desirable that a BLE connection is established and the transmission and reception of the capability are performed through BLE communication that results from establishing the BLE connection.

The terminal apparatus 100 acquires each piece of information that is illustrated in FIG. 7, when a Wi-Fi connection to the electronic apparatus 200 is made. In the case of an example in FIG. 7, the terminal apparatus 100 does not acquire information relating to the printer 3 without a connection to the printer 3 in FIG. 6. It is noted that when selecting the designation electronic apparatus, the terminal apparatus 100 may perform processing that temporarily establishes the Wi-Fi connection to the designation electronic apparatus, without depending on whether or not to provide an instruction for performing a job. If this is done, for the perspective of the terminal apparatus 100, the designation electronic apparatus is an electronic apparatus 200, the Wi-Fi connection to which was necessarily made in the past, and information relating to the designation electronic apparatus is already known.

Furthermore, in addition to the pieces of information that are illustrated in FIG. 7, connection information that is used when reconnection to each electronic apparatus 200 is made is stored in the storage unit 160 of the terminal apparatus 100. Because the printer 1 and the printer 2 are connected through the external access point 20, an SSID or a password of the external access point 20, an IP address of each electronic apparatus 200, and the like are stored. Because the printer 4 and the printer 5 are directly connected with WFD, an SSID and a password of each electronic apparatus 200 that functions as an internal access point are stored.

The processing unit 110 of the terminal apparatus 100 selects any one from among electronic apparatuses 200 that are illustrated in FIG. 7, as the designation electronic apparatus. An example in which the printer 1 is the designation electronic apparatus will be described below. In a case where an operation is performed on the print button in FIG. 5, the processing unit 110 reads information on the connection to the designation electronic apparatus from the storage unit 160, and attempts to make the Wi-Fi connection to the designation electronic apparatus.

If this is done, in a case where the print data needs to be transmitted, it is possible that an attempt is automatically made to make the Wi-Fi connection to the designation electronic apparatus. However, the designation electronic apparatus according to the present embodiment may be the electronic apparatus 200 that has not been connected.

2.2.2 Acquisition of the Status Information after the Job is Performed

In a case where an operation is performed on the print button on the screen for an instruction for performing printing in FIG. 5, the terminal apparatus 100 establishes a Wi-Fi connection to the printer 1 that is the designation electronic apparatus, transmits print data to the printer 1, and provides the instruction for performing a printing job. In other words, when instructing the electronic apparatus 200 to perform a job, the processing unit 110 performs processing that causes wireless communication in compliance with the first wireless communication scheme to switch from an OFF state to an ON state. If this is done, it is possible that high-speed Wi-Fi communication is used for the transmission of the print data or that Wi-Fi is turned off before the transmission of the print data, and thus that power consumption or the like is achieved.

Figure 8:
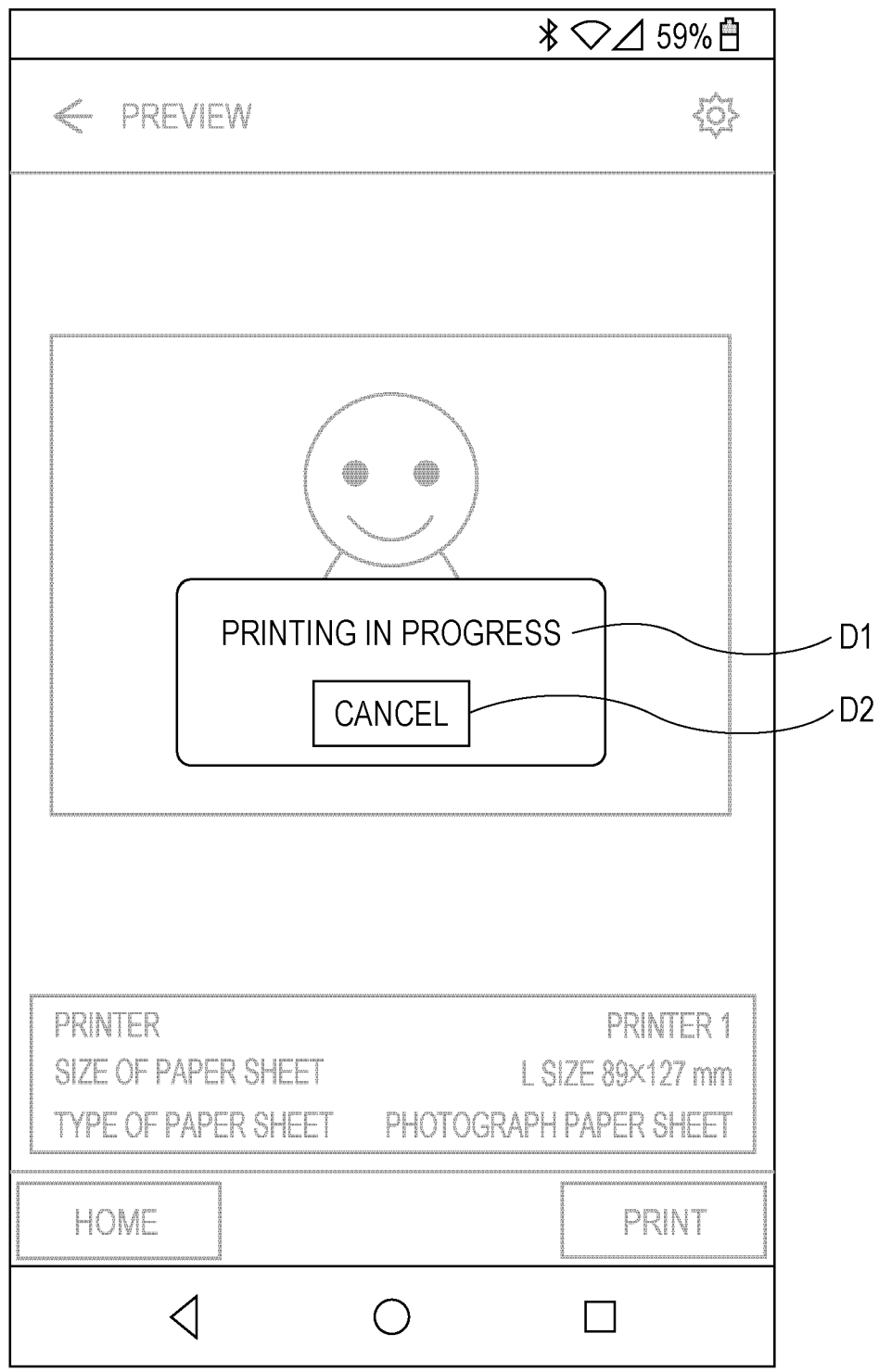
FIG. 8 is a diagram illustrating an example of a screen for job-performing in progress.
Figure 9:
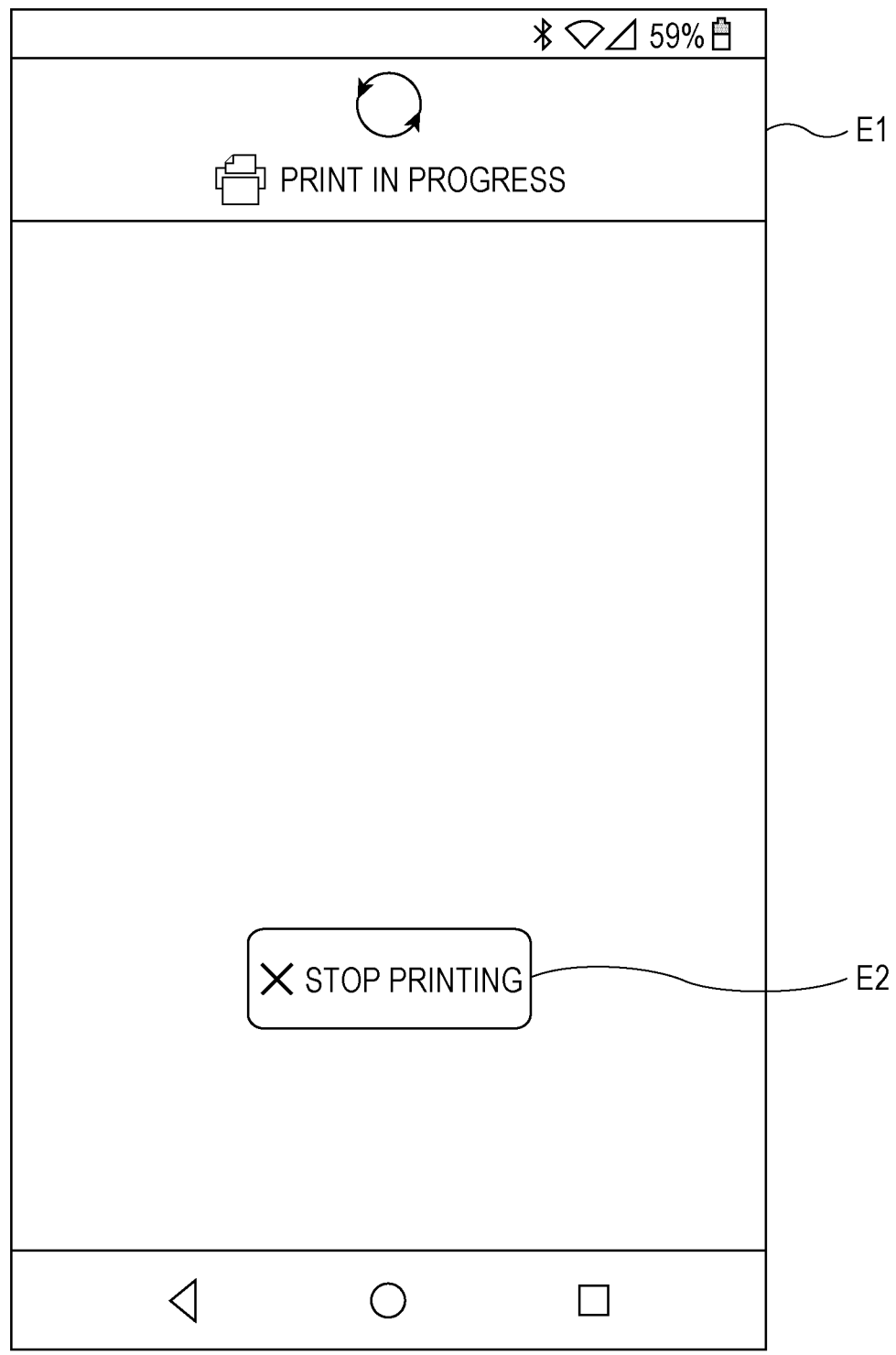
FIG. 9 is a diagram illustrating an example of the screen for job-performing in progress.

FIGS. 8 and 9 illustrate examples, respectively, of a screen for printing in progress, which is displayed on the display unit 130 of the terminal apparatus 100 after the printer is instructed to perform the print job. On the screen for printing in progress screen, which is illustrated in FIG. 8, a message (D1) that notifies a status of the electronic apparatus 200, that is, "PRINTING IN PROGRESS" is displayed in a pop-up format on the screen for an instruction for performing printing in FIG. 5. By displaying this message, the user can be notified that the designation electronic apparatus is instructed to perform a job. It is noted that in FIG. 8, a cancel button (D2) is displayed in a message window. In a case where an operation on the cancel button is detected, the processing unit 110 makes a Wi-Fi connection to the designation electronic apparatus and performs processing that provides an instruction for stopping the job.

Furthermore, the screen for printing in progress is not limited to being for adding a message to an existing screen. In an example in FIG. 9, a dedicated screen for printing in progress is displayed. On the screen for printing in progress in FIG. 9, a display (E1) that notifies the status of the electronic apparatus 200, that is, "PRINTING IN PROGRESS" and a button (E2) for providing an instruction for stopping printing are provided.

The monitoring by the terminal apparatus 100 of the situation where the job is performed is specifically monitoring of whether the job is normally completed or is abnormally ended due to an error. If a final result can be known, in some cases, specific progress to the result is not particularly needed. Consequently, the processing unit 110 acquires information as to whether the electronic apparatus 200 completely performs the job, as the status information on the electronic apparatus 200, using the second wireless communication scheme. If this is done, it is possible that the most noticeable information, that is, information as to whether the job is completed is suitably acquired from the electronic apparatus 200.

Then, the processing unit 110 performs processing that changes a display mode of a screen on which the status information is displayed before the job is completely performed in the electronic apparatus 200 and after the job is completely performed. At this point, the screen on which the status information is displayed before the job is completely performed is the screen for printing in progress that is illustrated in FIG. 8 or 9. D1 in FIG. 8 or E1 in FIG. 9 corresponds to the status information, and a status indicating that the job which the electronic apparatus 200 is instructed to do is being performed in the electronic apparatus 200 is displayed.

Figure 10:
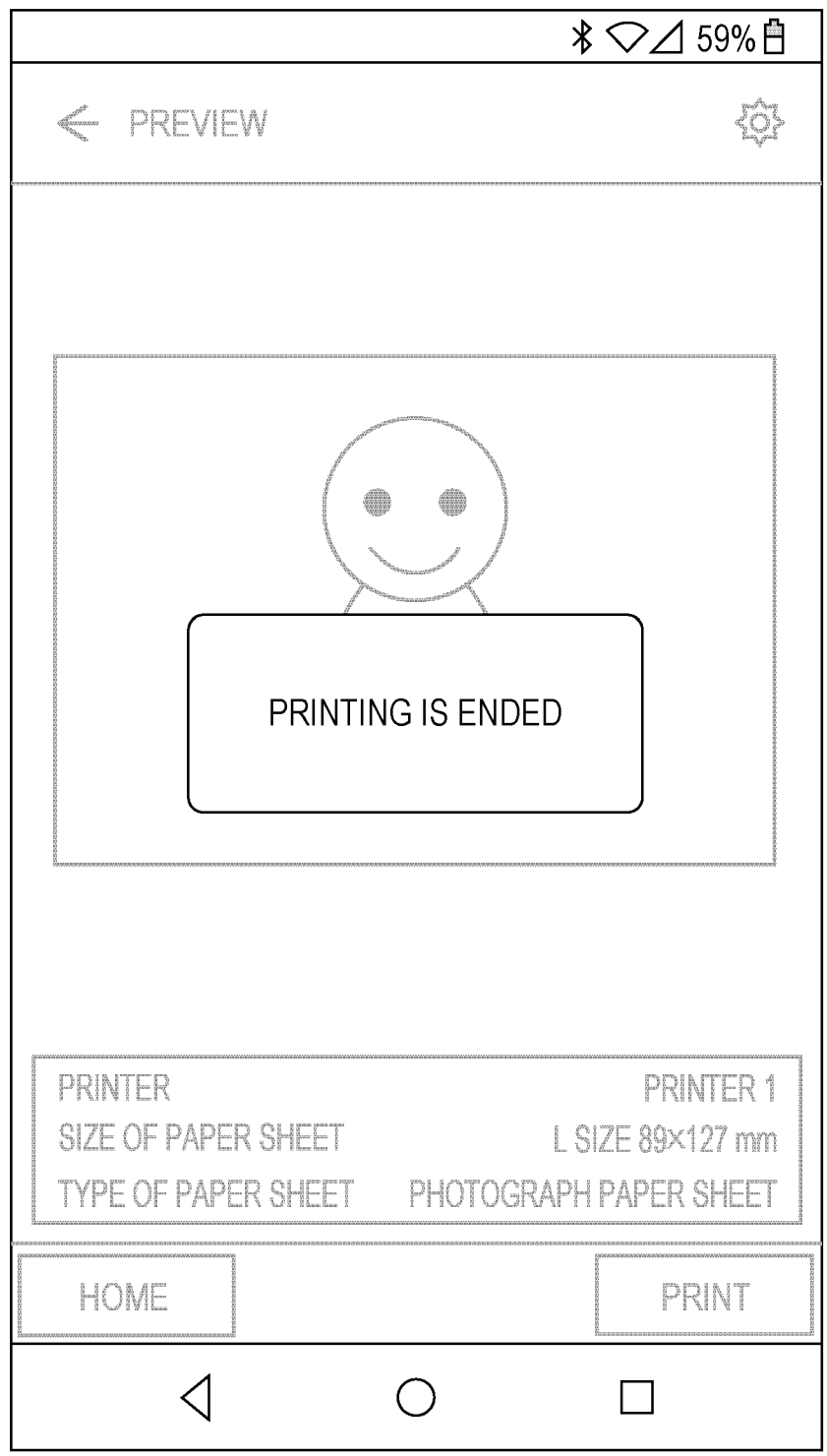
FIG. 10 is a diagram illustrating an example of a display screen in a case where a job is normally completed.
Figure 11:
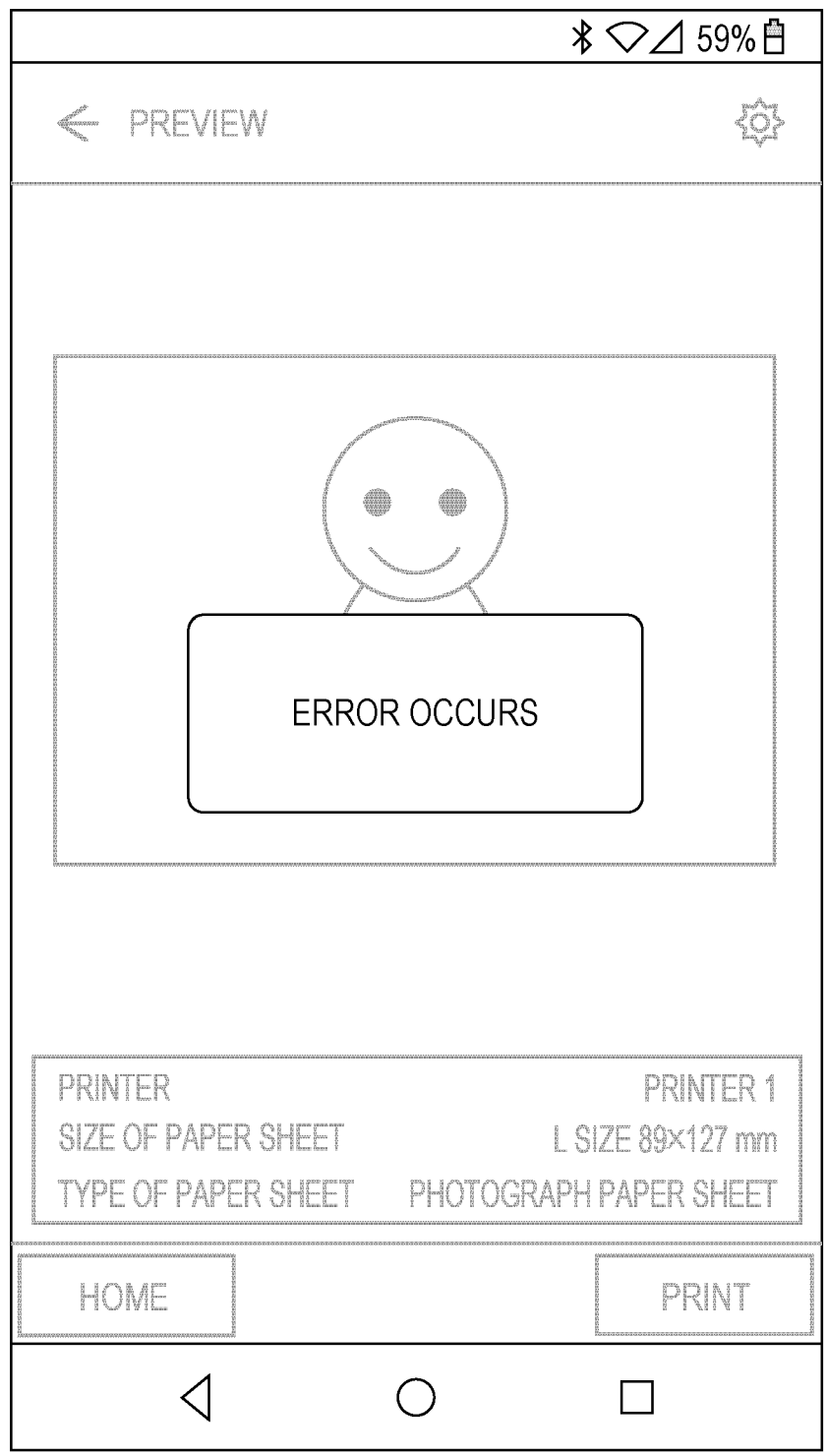
FIG. 11 is a diagram illustrating an example of a display screen in a case where the job is abnormally ended.

FIGS. 10 and 11 illustrate examples, respectively, of a screen on which the status information is displayed after the job is completely performed. It is noted that FIGS. 10 and 11 illustrate examples, respectively, of a screen that results from changing the display mode in one portion of FIG. 8 based on a screen in FIG. 8, but are also possibly based on FIG. 9. FIG. 10 illustrates an example of a display screen in a case where the printing job is normally completed, and the message "PRINTING IS ENDED" is displayed in a pop-up format on the screen for an instruction for performing printing. FIG. 11 illustrates an example of a display screen in a case where the printing job is abnormally ended, and the message "ERROR OCCURS" is displayed in a pop-up format on the screen for an instruction for performing printing.

As illustrated in FIGS. 8, 10, and 11, the change of the display mode is a change of the display mode of the message, that is, a change of the wording of the message. If this is done, with the change of the display mode, it is possible that a user of the terminal apparatus 100 is notified of the situation where the job is performed, in an easy-to-understand manner. It is noted that it is possible that the change of the display mode is possible. For example, in a case where the job is normally completed, the status information is changed to a non-display and thus returning to a screen display in FIG. 5 takes place. In a case where the job is abnormally ended, a screen in FIG. 11 may be displayed. Alternatively, instead of contents of the message, a format, a color, or a thickness of the text may be changed, and a display mode of an icon or an image may be changed.

At this point, the BLE communication necessary for the terminal apparatus 100 to acquire the status information from the electronic apparatus 200 may be communication that uses a BLE beacon signal, and may be communication that is available after a connection is established through pairing or bonding.

FIG. 12 illustrates an example of a data structure of the BLE beacon signal. The BLE beacon signal is available for various uses, and in some cases, multiple types of BLE beacon signals are also transmitted and received between the terminal apparatus 100 and the electronic apparatus 200. A beacon identifier is information that specifies for which use the BLE beacon signal is used. The beacon identifier in FIG. 12 is information which indicates that the BLE beacon signal is a beacon necessary for the terminal apparatus 100 to monitor the status of the electronic apparatus 200 and is information that is different from a beacon identifier of a beacon that is used for any other use.

Pieces of identification information on the electronic apparatuses 200 is pieces of information by which the electronic apparatuses 200 are identifiable from each other. The identification information here, for example, is the MAC address of the electronic apparatus 200, and, as the identification information, any other information may be used. However, as identification information in FIG. 12, information in the same format as the identification information in FIG. 7, which is retained in the terminal apparatus 100, or information which is possibly converted into the identification information in FIG. 7 and into which the identification information in FIG. 7 is possibly converted is used.

Status information is information that indicates a status of the electronic apparatus 200. The status information in a narrow sense is information that specifies whether an operating status of the electronic apparatus 200 is an idle status or an error status. The operation status is a state where the electronic apparatus 200 performs a job, such as printing, using a function of its own. A behavior in a case where a new job is input in the operating status is determined by a setting of the electronic apparatus 200, but for example, after a job that is currently being performed is completed, proceeding to perform the job that is newly input takes place. The idle status is a state where the electronic apparatus 200 waits for job inputting, without performing a job. The error status is a state where any error occurs, a status where a job cannot be performed, or a status where a problem occurs while a job is performed. In the case of a printer, the error status is a state where ink or toner is used up, a printing medium, such as a paper sheet, is used up, a printing medium is jammed up, a component failure occurs, or the like.

As described above, if the monitoring of the situation where the job is performed is monitoring whether or not the printing is completed, information that possibly identifies the three statuses described above sufficiently meets a condition for the status information. Specifically, in a case where the status proceeds from the operating status to the idle status, the processing unit 110 determines that the job is normally completed, and, in a case where the status proceeds from the operating status to the error status, determines that the job is abnormally ended. In this case, a data size of the status information is so small that the status information is possibly stored in the BLE beacon signal. For this reason, it is possible that processing that acquires the status information on the electronic apparatus 200 using the second wireless communication scheme is realized by processing that receives the BLE beacon signal.

The processing unit 110 can specify the electronic apparatus 200 that is instructed by the terminal apparatus 100 itself to perform the job, using the identification information. In a case where the printer 1 is instructed to perform a job, based on information that is illustrated in FIG. 7, it can be determined that the electronic apparatus 200, the identification information on which is "MAC ADDRESS 1", is instructed to perform the job. Consequently, when the BLE beacon signal is received, referring to the identification information that is included in the BLE beacon signal, the electronic apparatus 200 that is a transmission source can be specified. In the example described, because that it is determined that the BLE beacon signal, the identification information in which is "MAC ADDRESS 1" is a signal from the printer 1, based on the status information in the BLE beacon signal, it is determined which one of the screens in FIGS. 8, 10, and 11 is displayed. For example, the processing unit 110 displays the screen in FIG. 8 in a case where the status information is the operating status, displays the screen in FIG. 10 when proceeding from the operation status to the idle status takes place, and displays the screen in FIG. 11 when proceeding from the operating status to the error status.

However, in some cases, more detailed information is required as status information indicating the situation where the job is performed. For example, information as to when the printing is finished, or how much process is made in the printing at the present time is useful to the user who provides the instruction for performing printing. For this reason, the status information may include progress information indicating process in the job. The progress information is at least one of information indicating a rate of progress being made in the printing job, information on the time remaining until job completion and information on the estimated time for job completion.

Figure 13:
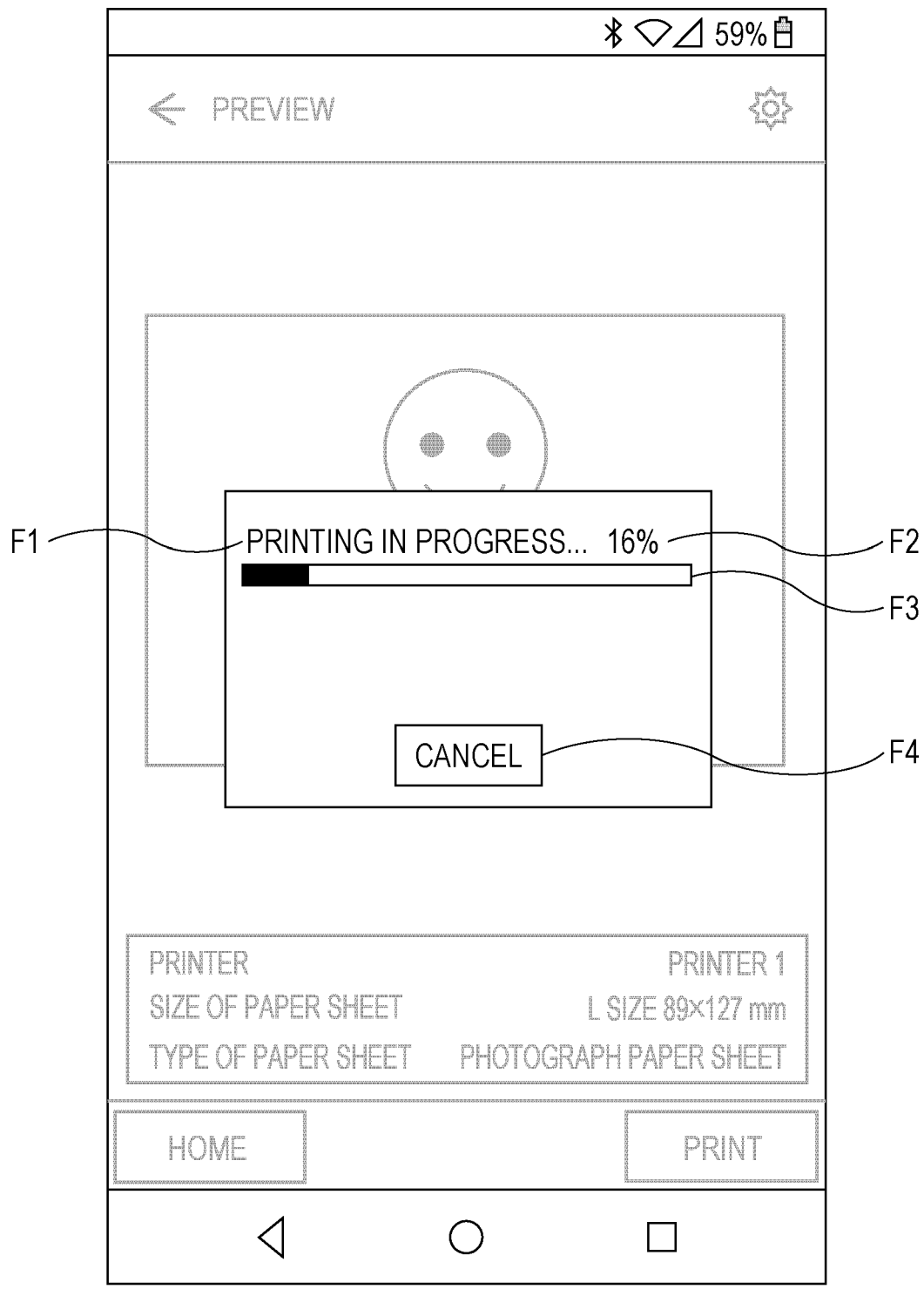
FIG. 13 is a diagram illustrating another example of the screen for job-performing in progress.

FIG. 13 illustrates another example of the screen for printing in progress, which is displayed on the display unit 130 of the terminal apparatus 100 after the printer is instructed to perform the print job. In the screen for printing in progress, which is illustrated in FIG. 13, in addition to the text (F1) "PRINTING IN PROGRESS", progress information on the job is displayed on the screen for an instruction for performing a job in FIG. 5, using a numerical value (F2) and a bar (F3), which indicate a ratio. A cancel button (F4) is the same as D2 of FIG. 8. The processing unit 110 periodically acquires the progress information using BLE, and updates a display of F2 or F3 in FIG. 13 at any time. Then, if it is determined that the printing is completed, proceeding to the display in FIG. 10 or 11 takes place. As illustrated in FIG. 13, if specific progress in the printing is known, the user makes a plan for what to do, such as performing any other job until the printing completion, or and waiting for the printing to be completed in the vicinity of the printer. Furthermore, in a case where a job is performed using a plurality of printers, by knowing the progress information in detail, it is possible that allocation of a part of the job to each printer is optimized.

Furthermore, the case where detailed information is required as the status information is not limited to the case where the progress management described above is performed. For example, in the error status, multiple error factors are considered as described above, and the user takes countermeasures that vary according to the error factors. For this reason, the terminal apparatus 100 acquires information indicating the error factor, as the status information, from the electronic apparatus 200, and displays a screen that notifies the error factor along with the error status. If this is done, it is possible that the user is urged to take an appropriate action.

Furthermore, a display of an amount of remaining ink as illustrated in A23 of FIG. 4 is widely used, but the display needs information on an amount of remaining ink for every color. More precisely, the status information may be the information on the amount of remaining ink for every color.

As described above, in a case where detailed information is used as the status information, the data size of the status information increases, and thus there is a likelihood that the status information will not be stored in the BLE beacon signal. In this case, the processing unit 110 of the terminal apparatus 100 instructs the electronic apparatus 200 to perform the job using Wi-Fi, and then performs control that causes Wi-Fi to be turned off and establishes a connection in compliance with BLE. Then, with the BLE communication after establishing the connection, the status information is acquired. If this is done, it is possible that detailed information is acquired as the status information and is displayed.

2.2.3 Acquisition of the Status Information Before the Job is Performed

Furthermore, the situation where the status information on the electronic apparatus 200 is acquired is not limited to the situation where the status information is acquired after the electronic apparatus 200 is instructed to perform the job. An example where the status information is available before the instruction for performing a job is provided will be described below.

There is a low need to make the Wi-Fi connection to the electronic apparatus 200 until the print button is tapped after the print data is being created or the creation of the print data is completed. The reason for this is because in some cases, it takes time to create the print data. An example where the Wi-Fi connection to the electronic apparatus 200 is not made while the print data is being created and thus an idling connection can be suppressed, an example where the Wi-Fi connection to the electronic apparatus 200 is not made while the print data is being created and thus a place where an operation of creating the print data is performed is not limited to the vicinity of the electronic apparatus 200, or the like is given.

However, when an operation is performed on the print button, in some cases, the electronic apparatus 200 is not available for the Wi-Fi connection to the terminal apparatus 100. For example, a case is considered where the terminal apparatus 100 is taken out to a place where the Wi-Fi connection to the electronic apparatus 200 cannot be made, or a case is considered where the terminal apparatus 100 is close to the electronic apparatus 200, but where the electronic apparatus 200 is in a powered-off state. In these cases, the terminal apparatus 100 attempts to make the Wi-Fi connection to the designation electronic apparatus without success, and waits until timeout of the connection attempt occurs. Because it takes approximately a long time to reach the timeout, the efficiency of the user's working decreases.

In this manner, there is also an advantage in that there is a low need to make the Wi-Fi connection before the instruction for performing the job is provided and that the connection is not made, but there is a likelihood that the efficiency of the working will decrease because the status of the electronic apparatus 200 is not entirely checked. Consequently, with the second wireless communication scheme, the processing unit 110 acquires the status information on the electronic apparatus 200 before the electronic apparatus 200 is instructed to perform the job. The status information here is information that indicates whether or not the electronic apparatus 200 is present in a state where the Wi-Fi connection is possible. Moreover, specifically, the status information is information indicating whether or not the BLE beacon signal can be received.

At this point, a case is considered where the printer 1 is selected as the designation electronic apparatus that is a target which is instructed to transmit the print data and perform the print job. The processing unit 110 performs processing that receives the BLE beacon signal. In a case where the BLE beacon signal that includes "MAC ADDRESS 1" that is identification information on the printer 1 can be received, it can be determined that the designation electronic apparatus is in a state where at least the BLE beacon signal is possibly transmitted and that a distance to the terminal apparatus 100 is short such that the BLE beacon signal possibly arrives. That is, in a case where the BLE beacon signal that includes the "MAC ADDRESS 1" is received, it can be determined that the designation electronic apparatus is present in the state where the Wi-Fi connection is possible. In a case where the BLE beacon signal that includes the "MAC ADDRESS 1" cannot be received, it can be determined that the designation electronic apparatus is not present.

Processing in the processing unit 110 for a result of the determination of the presence or absence is variously considered. For example, in a case where the designation electronic apparatus is present, the processing unit 110 performs processing that displays a screen for an instruction for performing a job on the display unit 130, and, in a case where the designation electronic apparatus is not present, performs processing that displays a screen for the absence on the display unit 130 instead of the screen for an instruction for performing a job. At this point, the screen for an instruction for performing a job is a screen that is used for providing an instruction for performing a job in the designation electronic apparatus. The screen for an instruction for performing a job corresponds to the screen for an instruction for performing printing in the printer, which is illustrated in FIG. 5. That is, in a case where the presence of the designation electronic apparatus can be checked, although an attempt is made to make a Wi-Fi connection in order to perform a job, there is no problem. Because of this, the screen for an instruction for performing a job is displayed as usual. If an operation of performing a job, which is performed by the user, or an operation on the print button in a narrow sense, is detected on the screen for an instruction for performing a job, an attempt is made to make a Wi-Fi connection, and, if the connection is established, transmission or reception of the processing-target data to and from the electronic apparatus 200 are performed.

Figure 14:
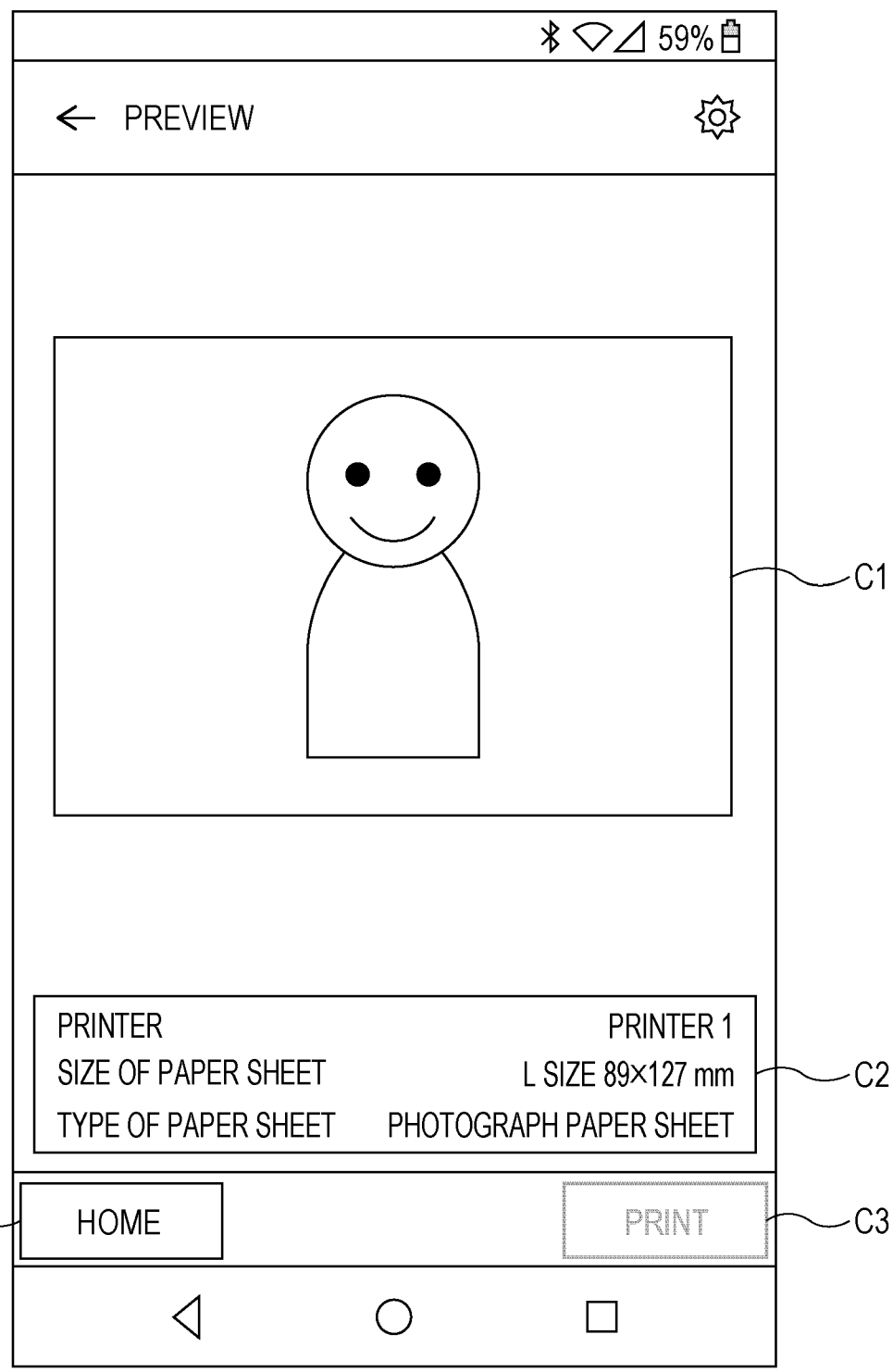
FIG. 14 is a diagram illustrating an example of a screen for the absence.

FIG. 14 illustrates an example of the screen for the absence. The screen for an instruction for performing a job is a screen on which, as illustrated in FIG. 5, an object for performing a job is displayed, and the screen for the absence is a screen that results from changing a mode for displaying the object on the screen for an instruction for performing a job. At this point, the object for performing a job is an object that a job starts to be performed in a case where an operation of designating the object is performed, and corresponds to a print button B3 in FIG. 5.

In an example in FIG. 14, C1, C2, and C4 are the same as B1, B2, and B4, respectively, in FIG. 5, but from a comparison between C3 and B3, it is understood that the mode for displaying the print button varies. The processing unit 110 disables the print button and thus does not cause an operation to be performed on the print button. Along with this, the processing unit 110 displays the print button in gray. That is, the print button is disabled, but is displayed in such a manner as to be visually recognized. The mode for displaying an object is not limited to that in FIG. 14, and by displaying oblique lines and or X marks in a superimposed manner, the disablement may be clearly expressed. Alternatively, a change from the text "printing" to the text "printing is disabled" or the like may take place. As illustrated in FIG. 14, by displaying the screen for the absence that is different from the screen for an instruction for performing a job, it is possible that a mode in which it is easy for the user to understand the absence of the designation electronic apparatus is presented. Accordingly, it is possible that the user is urged to take a corrective action without being caused to wait until the timeout occurs.

Alternatively, in a case where an operation of performing a job is detected, if the designation electronic apparatus is not present, the processing unit 110 instructs the designation electronic apparatus to perform the job, using the first wireless communication scheme, and if the designation electronic apparatus is not present, performs processing that displays the screen for the absence on the display unit 130. In other words, the processing unit 110 enables the print button itself. In a case where an operation is performed on the print button, the processing unit 110 changes the processing according to the presence or absence of the designation electronic apparatus.

Figure 15:
FIG. 15 is a diagram illustrating another example of the screen for the absence.

FIG. 15 illustrates an example of the screen for the absence in this case. As illustrated in FIG. 15, the message "PRINTER IS NOT FOUND. PRINTER IS NOT NEARBY OR POWER IS OFF" is displayed in a pop-up format on the screen for an instruction for performing printing in FIG. 5. By the message being displayed in this manner, the user can be definitely alerted to the absence of the designation electronic apparatus and is possibly urged to take a suitable corrective action.

Alternatively, the screen for the absence may be a message screen that notifies the presence of any other electronic apparatus that possibly performs a job. As illustrated in FIG. 7, a capability of the electronic apparatus 200 is stored in the storage unit 160 of the terminal apparatus 100. By using the capability, it is possible that unsuitable print data is suppressed from being created. For example, in a case where the electronic apparatus 200 that supports only an A4 paper sheet size or smaller is the designation electronic apparatus, the processing unit 110 prevents creation of print data with resolution that corresponds to a paper sheet size larger than the A4 paper sheet size. Alternatively, in a case where the electronic apparatus 200 that does not correspond to the CD label printing is the designation electronic apparatus, the processing unit 110 prevents creation of print data that is formed into the shape of a CD label. Specifically, the processing unit 110 performs processing in such a manner that a specific card is not displayed on the home screen that is illustrated in A1 of FIG. 4, or that a specific paper sheet size or printing mode cannot be selected.

By using the capability information, the electronic apparatus 200 that possibly supports the created print data can be specified. In the case of an example in FIG. 7, it can be determined whether or not the printer 2, the printer 4, and the printer 5 that are not the designation electronic apparatuses can take over a job of printing print data, which is to be performed by the printer 1 that is the designation electronic apparatus. Furthermore, the terminal apparatus 100 also receives the BLE beacon signal from the electronic apparatus 200 other than the designation electronic apparatus. For this reason, it is possible that the processing unit 110 determines the presence or absence of the electronic apparatus 200 other than the designation electronic apparatus.

That is, the processing unit 110 possibly supports the created print data, and can specify the electronic apparatus 200 of which the presence is ensured.

For example, it is determined that the print data which is created by the printer 1 is possibly printed in the printer 2 and that the printer 2 is present. In this case, the user sets the printer 2 as the designation electronic apparatus and thus it is possible that the print data is smoothly printed.

Figure 16:
FIG. 16 is a diagram illustrating another example of the screen for the absence.

FIG. 16 illustrates another example of the screen for the absence. As illustrated in FIG. 16, the message "PRINTER XX IS FOUND. WOULD YOU LIKE TO CHANGE TO THIS PRINTER FOR PRINTING" is displayed on a pop-up format on the screen for instruction for printing in FIG. 5. In the case of the example described above, the printer XX is the printer 2. In a case where a plurality of printers satisfy a condition, the plurality of printers may be displayed in such a manner as to be arranged side by side, and one printer may be selected from among the plurality of printers for display. With this message, substitute apparatuses that possibly suitably print the print data can be presented. Because of this, the user does not need to wait for a long time and an improvement in convenience is possible.

However, the status information that is acquired before the instruction for performing the job is provided is not limited to the information indicating the presence or absence. Although the electronic apparatus 200 is present in the state where the Wi-Fi connection is possible, in a case where the electronic apparatus 200 is in the operating status or the error status, in order to suitably perform the job, there is a need to wait for any other job to be ended or to recover from the error status. Consequently, the processing unit 110 may acquire information indicating at least one of the error status and the operating status, as the status information.

By acquiring this status information, before the instruction for performing a job is provided, the processing unit 110 can recognize that there is a likelihood that it will take time to perform the job or that if the user does not take a corrective action, the job cannot be performed. If the status information is displayed on the display unit 130, it is also possible that the designation electronic apparatus is reselected, or that the user is urged to take a corrective action, such as replacing ink in the designation electronic apparatus. It is noted that the status information indicating the error status or the operating status may be displayed on the screen for an instruction for performing printing in FIG. 5, and may be displayed on the screen for print in progress in FIG. 8 and other figures.

2.2.4 Specific Mode of the Second Wireless Communication Scheme

The processing that acquires the status information that is available after the instruction for performing the job is provided and the processing that acquires the status information before the instruction for performing the job is provided. Before the instruction for performing the job is provided, the processing unit 110 may determine the presence or absence of the electronic apparatus 200, or may determine whether the error status or the operating status is entered, and the status information is relatively simple data. On the other hand, after the instruction for performing the job is provided, there are many cases where detailed information such as the progress information on the job is required, and the status information is comparatively complicated and thus it is easy for the data size to increase.

Considering this aspect, the processing unit 110 acquires the status information on the electronic apparatus 200, which is available before the instruction for performing the job is provided, using the beacon signal in compliance with the second wireless communication scheme, and acquires the status information on the electronic apparatus 200, which is available before the instruction for performing the job is provided, through the communication that is available after the communication connection in compliance with the second wireless communication scheme is established.

Specifically, the status information is acquired using the advertisement packet that is the BLE beacon signal, before the instruction for performing the job is provided, and is acquired through the communication that is available after the pairing or the bonding is performed, after the instruction for performing the job is provided. If this is done, it is possible that according to the details of the status information that is necessary for each situation the wireless communication in communication with the second wireless communication scheme is realized using a suitable communication mode. It is noted that, as described above, the status information on the electronic apparatus 200, which is available after the instruction for performing the job is provided, is also acquired without any constraint with the BLE beacon signal, depending on the situation. Furthermore, the status information on the electronic apparatus 200, which is available before the instruction for performing the job is provided, is also acquired without any constraint through the communication that is available after the communication connection in compliance with the second wireless communication scheme.

Furthermore, the BLE beacon signal may be used for establishing the Wi-Fi connection. As described above, in a case where an operation is performed on the print button on the screen for an instruction for performing printing, an attempt is made to make the Wi-Fi connection to the electronic apparatus 200 that is the designation electronic apparatus. However, in a case where the electronic apparatus 200, like the electronic apparatus 200-4 or the electronic apparatus 200-5 in FIG. 6, functions as the access point, in order to establish the connection to the selected electronic apparatus 200, there is a need for not only an SSID of the electronic apparatus 200, but also a password that corresponds to the SSID.

If the connection to the electronic apparatus 200 that is a target has been made in the past, it is considered that the password that corresponds to the SSID is stored in the storage unit 160. However, in a case where the connection to the designation electronic apparatus has not been made, the password is unknown to the terminal apparatus 100. Furthermore, this is also the same for a case where the SSID and the password of the designation electronic apparatus are changed after the connection in the past between the designation electronic apparatus and the terminal apparatus 100 is released. On this occasion, a request to the user for manual inputting of the password imposes a heavy burden on the user.

Consequently, the second wireless communication unit 122 of the terminal apparatus 100 acquires the connection information that is used for the first wireless communication scheme, using the beacon signal that is transmitted from the electronic apparatus 200 before the instruction for performing the job is provided, and the first wireless communication unit 121 establishes a connection to the electronic apparatus 200 using the connection information. The connection information here is information on an SSID and a password. Furthermore, the connection information may include information that specifies an encryption scheme, and the like.

If this is done, it is possible that the connection between the terminal apparatus 100 and the electronic apparatus 200 switches to the first wireless communication scheme, using a result of communication in compliance with the second wireless communication scheme. The switching among the communication schemes is hereinafter also expressed as handover. The handover here is specifically handover from BLE to Wi-Fi.

FIG. 17 illustrates an example of a data structure of the BLE beacon signal. In addition to the beacon identifier, and the identification information and the status information on the electronic apparatus 200, which are illustrated in FIG. 12, the BLE beacon signal includes an SSID of the electronic apparatus 200 that functions as an access point, and a password that corresponds to the SSID. The BLE beacon signal that is illustrated in FIG. 17 is received from the electronic apparatus 200, and thus the processing unit 110 can specify the password that corresponds to the SSID. If this is done, because the establishment of the Wi-Fi connection can be automated, a reduction in the burden on the user is possible. It is noted that the terminal apparatus 100 searches for the electronic apparatus 200 that functions as the access point, using the Wi-Fi beacon signal, and list-displays a result of the search on a selection screen (A3) in FIG. 4. Information that is list-displayed is information that is included in the Wi-Fi beacon signal, and for example, is the SSID of, or the identification information on, the electronic apparatus 200. At a stage where the user selects the designation electronic apparatus on the selection screen, the identification information on, or the SSID of, the designation electronic apparatus is already known. For this reason, by using the identification information or the SSID that is included in the BLE beacon signal, the processing unit 110 can suitably determine whether or not the BLE beacon signal is a signal that is transmitted from the designation electronic apparatus.

It is noted that in FIG. 17, an example in which the password itself is included in the BLE beacon signal is illustrated, but no limitation to this is imposed. For example, a rule for generation of a password may be shared between the terminal apparatus 100 and the electronic apparatus 200, and the processing unit 110 of the terminal apparatus 100 may perform processing that generates a password according to the rule for generation. Specifically, the processing unit 110 performs conversion processing that is based on the MAC address which is acquired with the BLE beacon signal, and generates a password. It is noted that the processing unit 110 may be capable of generating a password that corresponds to an SSID, and a target for the conversation processing may be information other than the MAC address. If this is done, because there is no need to broadcast a password with the BLE beacon signal, it is possible that the security is improved.

2.2.5 Flow for Processing

Figure 18:
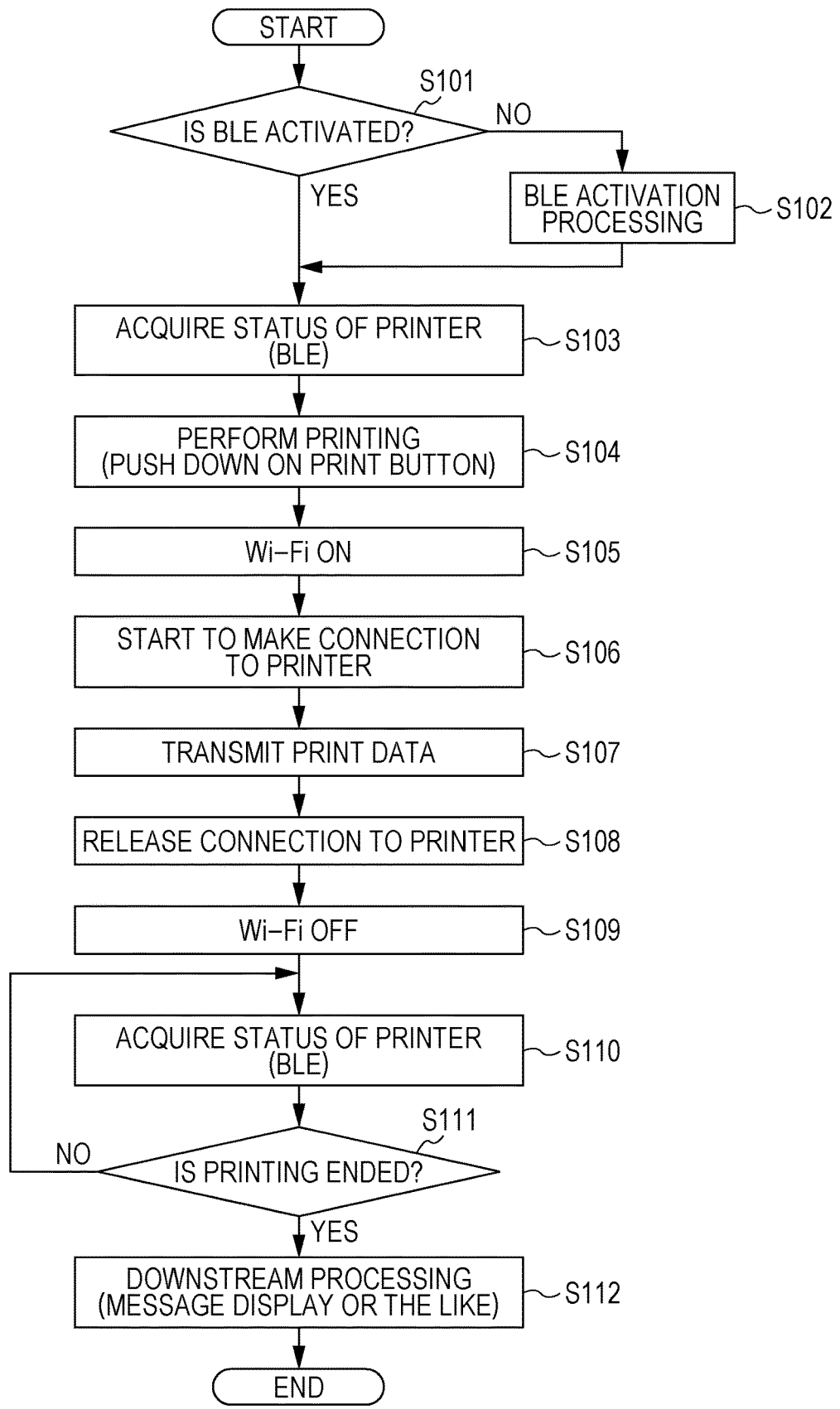
FIG. 18 is a flowchart for describing processing in the present embodiment.

FIG. 18 is a flowchart for describing processing from activation of the print application to completion of performing of the job. When the processing is started, the processing unit 110 determines whether or not BLE has been activated (S101), and, when a BLE function of the terminal apparatus 100 is not turned on, performs processing that activates BLE (S102).

Thereafter, the status information on the electronic apparatus 200 is acquired using BLE (S103). Processing in S103 corresponds to processing that acquires the status information that is available before the instruction for performing the job. That is, the processing in S103 is specifically processing that receives the BLE beacon signal, and more specifically, processing that specifies and displays the status information on the designation electronic apparatus based on the BLE beacon signal. As described above, processing is performed that displays a screen in accordance with the presence or absence of the designation electronic apparatus, or the error status or the operating status.

After the processing in S103, when an operation on the print button id detected on the screen for an instruction for performing printing (S104), the processing unit 110 sets the Wi-Fi function of the terminal apparatus 100 to be turned on (S105), and starts to make a connection to the designation electronic apparatus (S106). If the Wi-Fi connection to the designation electronic apparatus is established, the processing unit 110 performs processing that transmits the print data to the designation electronic apparatus through the Wi-Fi connection (S107). If the print data is completely transmitted, the processing unit 110 releases the Wi-Fi connection to the designation electronic apparatus (S108), and causes the Wi-Fi function of the terminal apparatus 100 to be turned off (S109).

After the processing in S109, the status information that is available after the instruction for performing the job is performed is provided is acquired. Specifically, the processing unit 110 acquires the status information on the designation electronic apparatus using BLE (S110). The processing in S110 may be processing that receives the BLE beacon signal, but, considering the data size of the status information, it is desirable that processing which establishes the BLE connection and acquires the status information through the communication that is available after the BLE connection is established. The processing unit 110 determines whether or not the printing is completed in the electronic apparatus 200 (S111), and, in a case where the printing is not completed (No in S111), returns to S110 and periodically monitors the status of the electronic apparatus 200. The processing in S111 is processing that specifically determines whether or not status information indicating the printing completion is received.

In a case where it is determined that the printing is completed in the electronic apparatus 200 (Yes in S111), processing that, for example, displays a message that is available after the instruction for performing the job is provided is performed (S112) and the processing is ended. The processing S112 is display processing in FIG. 10 or 11. It is noted that, after the processing in S112, instead of ending the print application, returning to S103 may take place and the processing may be continued.

3. Modification Example

Several modification examples will be described below.

3.1 Switching of an Operation Mode

As illustrated above, the Wi-Fi connection between the terminal apparatus 100 and the electronic apparatus 200 is suppressed and the status information is acquired using BLE, and thus both the convenience and the reduction in power consumption are possible. However, in this technique, there is a concern that the number of times that handover occurs between Wi-Fi and BLE will increase and that the time taken for the handover will increase.

Consequently, in view of the cost in time, the processing unit 110 may switch an operation mode according to an amount of remaining power of a battery in the terminal apparatus 100. The processing unit 110 according to the present modification example performs processing that switches an operation mode of the terminal apparatus 100 between a first mode and a second mode. In the first mode, the processing unit 110 performs control that turns off the wireless communication in compliance with the first wireless communication scheme after the instruction for performing the job is provided, and acquires the status information on the electronic apparatus 200 using the second wireless communication scheme. Furthermore, in the second mode, the processing unit 110 maintains the wireless communication in compliance with the first wireless communication scheme in an ON state after the instruction for performing the job is provided, and acquires the status information on the electronic apparatus 200 using the first wireless communication scheme.

Specifically, in a case where it is determined that the amount of remaining power of the battery is below a threshold, the processing unit 110 sets the operation mode to be the first mode, and, in a case where it is determined that the amount of remaining power of the battery is at or above the threshold, sets the operation to be the second mode. The amount of remaining power of the batter represents a voltage value of a terminal to which power is supplied from the battery. That is, in a case where the amount of remaining power of the battery is sufficient, the operation mode is set to be the second mode, and, after the instruction for performing the job is provided, the communication in compliance with Wi-Fi is also continued. In this case, power consumption is relatively high, but there is an advantage in that the handover does not occur. On the other hand, in a case where the amount of remaining power of the batter is insufficient, the operation mode is set to be the first mode, and, after the instruction for performing the job is provided, Wi-Fi is turned off and switching to BLE takes place. In this case, the handover occurs, but the reduction in power consumption is possible.

It is noted that at this point, the acquisition of the status information after the instruction for performing the job is described, but that a situation where the operation mode is switchable is not limited to this. In arbitrary situations where there is a likelihood that the status information on the electronic apparatus 200 will be acquired, before the instruction for performing the job is provided, which include a situation where the instruction for performing the job has not yet been provided, the processing unit 110 may set the operation mode to be the first mode and thus may acquire the status information using BLE, and may set the operation mode to be the second mode and thus may acquire the status information using Wi-Fi.

Figure 19:
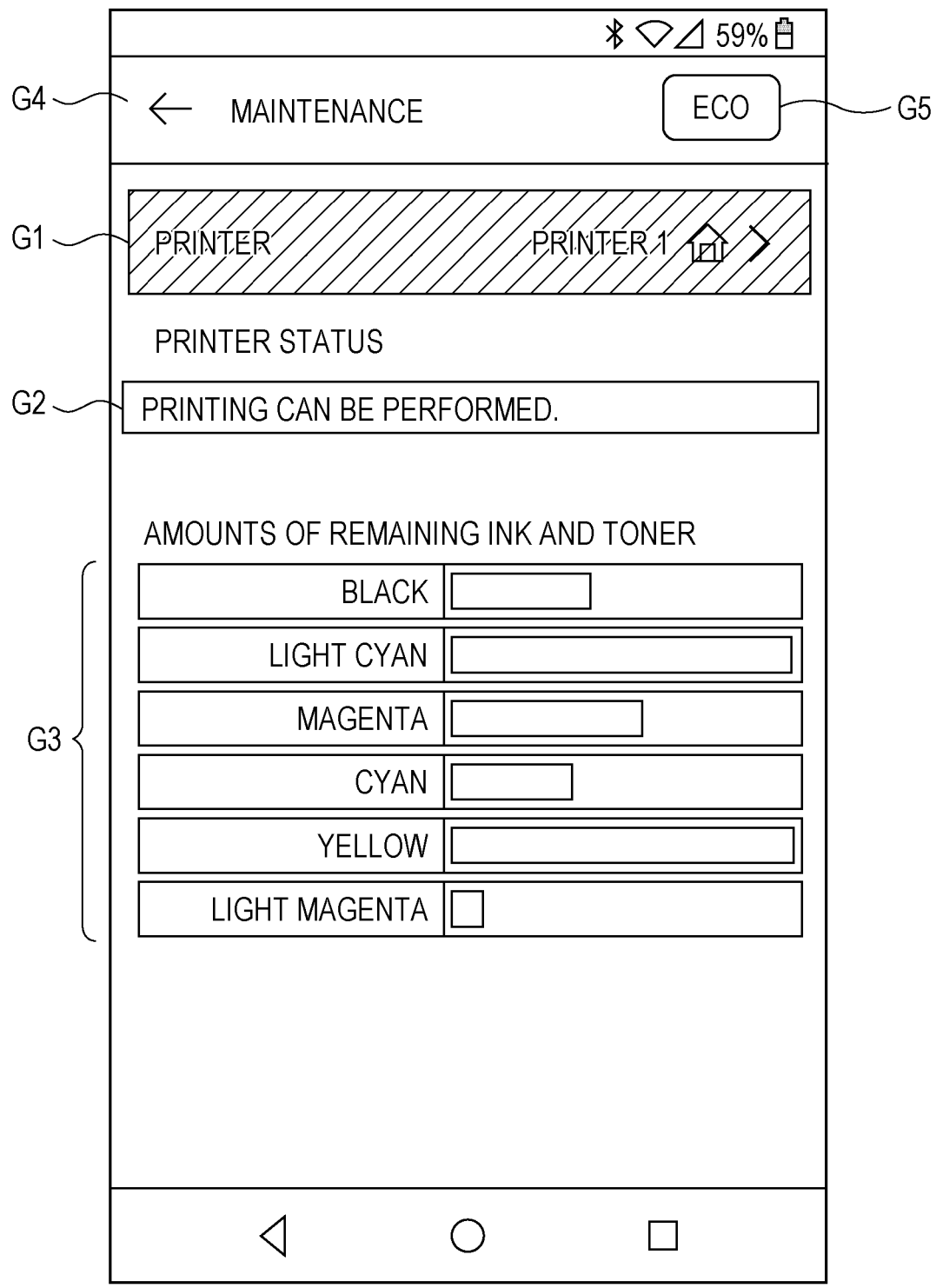
FIG. 19 is a diagram illustrating an example of a display screen that includes an object which alerts that a low power consumption mode is entered.

Furthermore, in the first mode, the processing unit 110 performs processing that displays on the display unit 130 a display screen that includes an object which alerts that a low power consumption mode is entered. FIG. 19 illustrates an example of the display screen that includes the object which alerts that the low power consumption mode is entered. G1 to G4 of FIG. 19 are the same as A21 to A24, respectively, of FIG. 4, and G5 is an object which alerts that the low power consumption mode is entered. That is, FIG. 19 illustrates an example in which the object which alerts that the low power consumption mode is entered is displayed on the maintenance screen. It is noted that the object which alerts that the low power consumption mode is entered may be displayed on any other screen in FIGS. 8, 10, and 11 and other figures.

As illustrated in G5 of FIG. 19, the object which alerts that the low power consumption mode is entered is an object in the shape of approximately a rectangle, which includes the text "ECO" that is short for ecology. However, the object is not limited to this, and may be an object that includes the text "LOW POWER CONSUMPTION MODE" or "BLE CONNECTION IN PROGRESS".

By displaying this object, the user can be notified that the terminal apparatus 100 operates in a mode in which power is less consumed, specifically that communication is performed with BLE without using Wi-Fi.

It is noted that the example is described above in which the display image is displayed on the display unit 130 of the terminal apparatus 100, but that no limitation to this is imposed. For example, the processing unit 110 of the terminal apparatus 100 may perform processing that displays various screens in FIG. 4 and other figures on a display unit of an apparatus that is different from the terminal apparatus 100. For example, it is considered that processing that creates the print data or processing that transmits the print data is performed in the terminal apparatus 100 and that the screens in FIG. 4 and other figures are displayed on a display unit of a wearable apparatus such as a smartwatch or a head-mounted display. The "processing for displaying" in this case is processing that transmits image data which is displayed on each screen, processing that provides an instruction for display, or the like.

3.2 System, Program, and the Like

Furthermore, a target in which the technique according to the present embodiment finds application is not limited to the terminal apparatus 100 that has been described above.

The technique according to the present embodiment, as illustrated in FIG. 1, can find application in the communication system 10 that includes the terminal apparatus 100 and the electronic apparatus 200, which are described above. The communication system 10, as illustrated in FIG. 6, may include a plurality of electronic apparatuses 200.

Furthermore, one or several of, or most of the processing operations by the terminal apparatus 100 or the electronic apparatus 200 according to the present embodiment may be realized by a program. In this case, a CPU or the like executes the program, and thus the terminal apparatus 100 and the like according to the present embodiment are realized. Specifically, the program that is stored on a non-volatile information storage medium is read and the processor such as the CPU executes the program that is read. The information storage medium here is a computer-readable recording medium. A program, data, and the like are stored in the information storage medium. A function of the information storage medium can be realized by an optical disk, such as a DVD or a CD, an HDD, a memory, or the like. Then, the processor such as the CPU performs various processing operations according to the present embodiment based on the program that is stored in the information storage medium. That is, a program that causes a computer to function as each unit according to the present embodiment is stored in the information storage medium.

Furthermore, the technique according to the present embodiment can find application in a communication control method that performs one or several of, or all of the processes that are illustrated in FIG. 18, a display control method, a method of controlling the terminal apparatus 100, or a method of operating the terminal apparatus 100. In a communication control method according to the present embodiment, which is a communication control method in a terminal apparatus 100 that includes a first wireless communication unit 121 which performs wireless communication with an electronic apparatus 200 using a first wireless communication scheme, and a second wireless communication unit 122 which performs the wireless communication with the electronic apparatus 200 using a second wireless communication scheme that is different from the first wireless communication scheme, the electronic apparatus 200, a communication connection to which is made with the first wireless communication scheme, is instructed to perform a job, control is performed that turns off the wireless communication in compliance with the first wireless communication scheme, and status information on the electronic apparatus 200 is acquired using the second wireless communication scheme.

The embodiments and the modification examples thereof in which the invention finds application are described above, but the invention is not limited to the embodiments and the modification examples thereof as are. At stages of implementation, a constituent element can be modified and thus a modification thereto can be realized within the scope that does not depart from the gist of the invention. Furthermore, various inventions can be conceived and be reduced to practice by suitably combining the multiple constituent elements that are disclosed in each of the embodiments or each of the modification examples thereof, which are described above. For example, of all constituent elements that are described in each of the embodiments or each of the modification examples thereof, several constituent elements may be deleted. Moreover, the constituent elements that are described in the different embodiments or the different modification examples thereof may be suitably combined. Furthermore, in the specification or the drawings, a term that is described at least once together with a different term that has a broader meaning or the same meaning can be replaced with the different term, throughout the specification or the drawings. In this manner, various modifications or applications are possible within the scope that does not depart from the gist of the invention.

The entire disclosure of Japanese Patent Application No. 2018-032907, filed Feb. 27, 2018 is expressly incorporated by reference herein.

What is claimed is:

1. A terminal apparatus comprising:
a first wireless communication interface that performs wireless communication with an electronic apparatus using a first wireless communication scheme;
a second wireless communication interface that performs wireless communication with the electronic apparatus using a second wireless communication scheme that is different from the first wireless communication scheme, the first wireless communication scheme having a greater power consumption than the second wireless communication scheme; and
a processor that performs communication control of the first wireless communication interface and the second wireless communication interface,
wherein the processor instructs the electronic apparatus, a communication connection to which is made with the first wireless communication scheme, to perform a job, and then performs control that turns off the wireless communication in compliance with the first wireless communication scheme and acquires status information on the electronic apparatus using the second wireless communication scheme, such that the power consumption of the terminal apparatus is reduced.

2. The terminal apparatus according to claim 1,
wherein the processor acquires information as to whether or not the electronic apparatus completely performs the job, as the status information on the electronic apparatus, using the second wireless communication scheme.

3. The terminal apparatus according to claim 2,
wherein the processor performs processing that changes a display mode of a screen on which the status information is displayed, before the job is completely performed in the electronic apparatus and after the job is completed.

4. The terminal apparatus according to claim 1,
wherein when instructing the electronic apparatus to perform the job, the processor performs control that switches the wireless communication in compliance with the first wireless communication scheme from OFF to ON.

5. The terminal apparatus according to claim 1,
wherein, before instructing the electronic apparatus to perform the job, the processor acquires the status information on the electronic apparatus using the second wireless communication scheme.

6. The terminal apparatus according to claim 5,
wherein the processor acquires the status information on the electronic apparatus, which is available before the instruction for performing the job is provided, using a beacon signal in compliance with the second wireless communication scheme, and acquires the status information on the electronic apparatus, which is available after the instruction for performing the job is provided, through communication that is available after a communication connection in compliance with the second wireless communication scheme is established.

7. The terminal apparatus according to claim 6,
wherein the second wireless communication interface acquires connection information that is used for the first wireless communication scheme, using the beacon signal that is transmitted from the electronic apparatus, before the instruction for performing the job is provided, and
wherein the first wireless communication interface establishes a connection to the electronic apparatus using the connection information.

8. The terminal apparatus according to claim 1,
wherein the processor performs processing that switches an operation mode of the terminal apparatus between a first mode and a second mode,
wherein, in the first mode, after the instruction for performing the job is provided, the processor performs control that turns off the wireless communication in compliance with the first wireless communication scheme and acquires the status information on the electronic apparatus using the second wireless communication scheme, and
wherein, in the second mode, after the instruction for performing the job is provided, the processor maintains a state where the wireless communication in compliance with the first wireless communication scheme is turned on and acquires the status information on the electronic apparatus using the first wireless communication scheme.

9. The terminal apparatus according to claim 8,
wherein, in the first mode, the processor performs processing that displays a display screen which includes an object alerting that a low power consumption mode is entered, on a display unit.

10. The terminal apparatus according to claim 1,
wherein the first wireless communication scheme is a communication scheme that complies with Wi-Fi standards, and
wherein the second wireless communication scheme is a communication scheme that complies with Bluetooth standards.

11. A communication system comprising:
the terminal apparatus according to claim 1; and
the electronic apparatus.

12. A non-transitory computer-readable recording medium on which a program is stored, the program causing a computer to function as:
a first wireless communication interface that performs wireless communication with an electronic apparatus using a first wireless communication scheme;
a second wireless communication interface that performs wireless communication with the electronic apparatus using a second wireless communication scheme that is different from the first wireless communication scheme, the first wireless communication scheme having a greater power consumption than the second wireless communication scheme; and a processor that performs communication control of the first wireless communication interface and the second wireless communication interface, wherein the processor instructs the electronic apparatus, a communication connection to which is made with the first wireless communication scheme, to perform a job, and then performs control that turns off the wireless communication in compliance with the first wireless communication scheme and acquires status information on the electronic apparatus using the second wireless communication scheme, such that power consumption of the computer is reduced.

13. A communication control method in a terminal apparatus including a first wireless communication interface which performs wireless communication with an electronic apparatus using a first wireless communication scheme, and a second wireless communication interface which performs wireless communication with the electronic apparatus using a second wireless communication scheme that is different from the first wireless communication scheme, the first wireless communication scheme having a greater power consumption than the second wireless communication scheme, the method comprising:

instructing the electronic apparatus, a communication connection to which is made with the first wireless communication scheme, to perform a job;

performing control that turns off the wireless communication in compliance with the first wireless communication scheme; and acquiring status information on the electronic apparatus using the second wireless communication scheme, such that the power consumption of the terminal apparatus is reduced.

* * * * *